United States Patent
Iijima et al.

(10) Patent No.: US 12,528,492 B2
(45) Date of Patent: Jan. 20, 2026

(54) CONTROL DEVICE, CONTROL METHOD, AND STORAGE MEDIUM STORING CONTROL PROGRAM

(71) Applicant: HONDA MOTOR CO., LTD., Tokyo (JP)

(72) Inventors: Takeshi Iijima, Tokyo (JP); Osamu Takahata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 18/539,992

(22) Filed: Dec. 14, 2023

(65) Prior Publication Data
US 2025/0196873 A1    Jun. 19, 2025

(51) Int. Cl.
*B60W 50/14*    (2020.01)
*B60R 1/22*    (2022.01)

(52) U.S. Cl.
CPC ............ *B60W 50/14* (2013.01); *B60R 1/22* (2022.01); *B60R 2300/305* (2013.01); *B60R 2300/806* (2013.01); *B60R 2300/8086* (2013.01); *B60W 2050/146* (2013.01); *B60W 2300/14* (2013.01); *B60W 2556/40* (2020.02)

(58) Field of Classification Search
CPC ........... B60W 50/14; B60W 2050/146; B60W 2300/14; B60W 2556/40; B60R 1/22; B60R 2300/305; B60R 2300/806; B60R 2300/8086
See application file for complete search history.

(56) References Cited

U.S. PATENT DOCUMENTS

| | | | |
|---|---|---|---|
| 2010/0171828 A1* | 7/2010 | Ishii ................. | H04N 7/183 348/135 |
| 2016/0059888 A1* | 3/2016 | Bradley ............. | B62D 13/06 701/41 |
| 2017/0083773 A1* | 3/2017 | Greenwood ....... | B60R 1/26 |
| 2017/0272664 A1* | 9/2017 | Lang ................. | B62D 13/06 |

* cited by examiner

*Primary Examiner* — Omeed Alizada
(74) *Attorney, Agent, or Firm* — Paratus Law Group, PLLC

(57) ABSTRACT

A control device includes a movement state acquisition unit 55 that acquires a movement state of a vehicle 10 towing a trailer 60, a relative position acquisition unit 56 that acquires a relative position between the vehicle 10 and the trailer 60, and a display control unit 57 that displays a first predictive guide indicating a predicted passing area of the vehicle 10 and a second predictive guide indicating a predicted passing area of the trailer 60. The display control unit 57 changes display of at least one of the first predictive guide of the vehicle 10 and the second predictive guide of the trailer 60 based on the movement state of the vehicle 10 and the relative position between the vehicle 10 and the trailer 60.

18 Claims, 14 Drawing Sheets

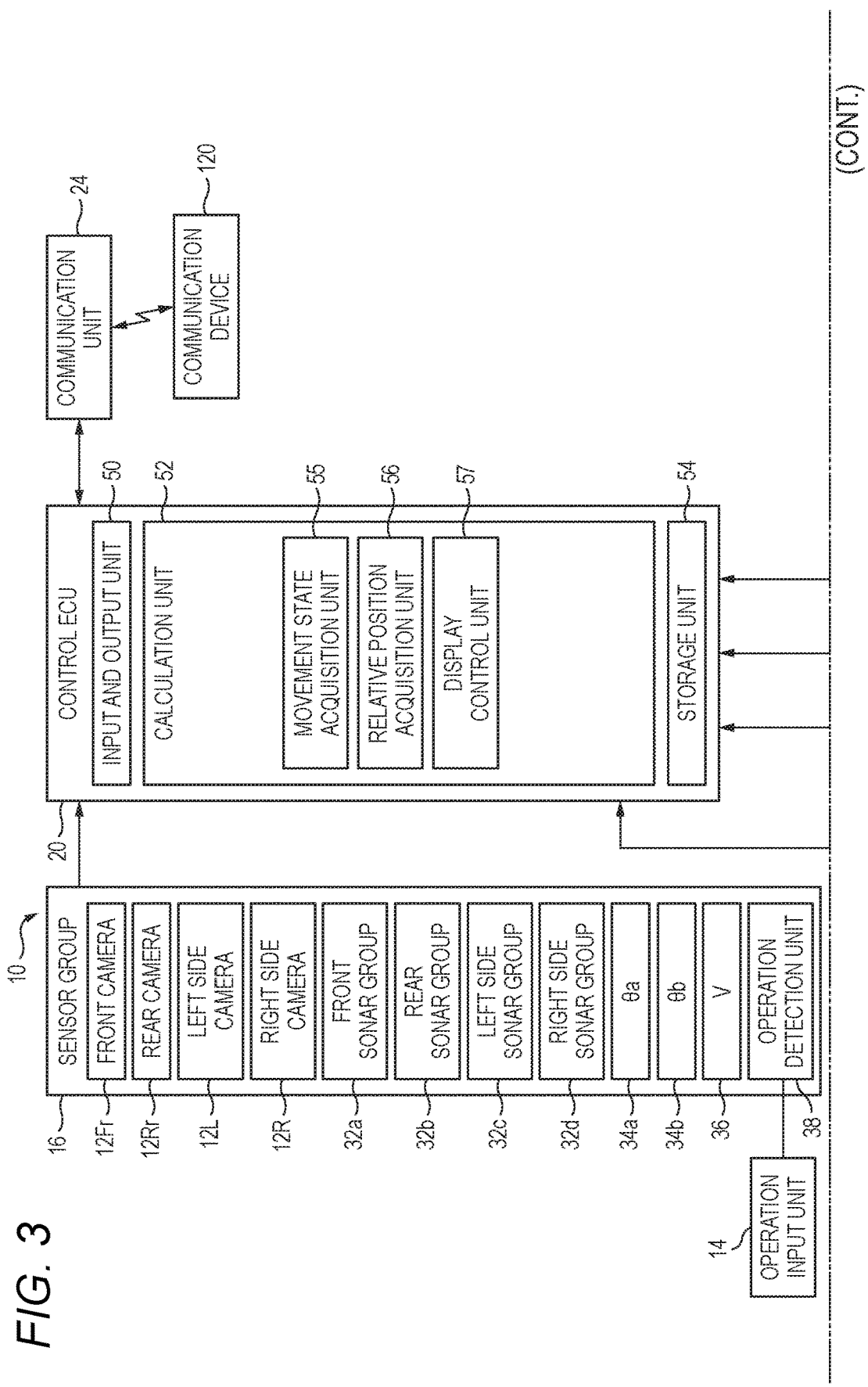

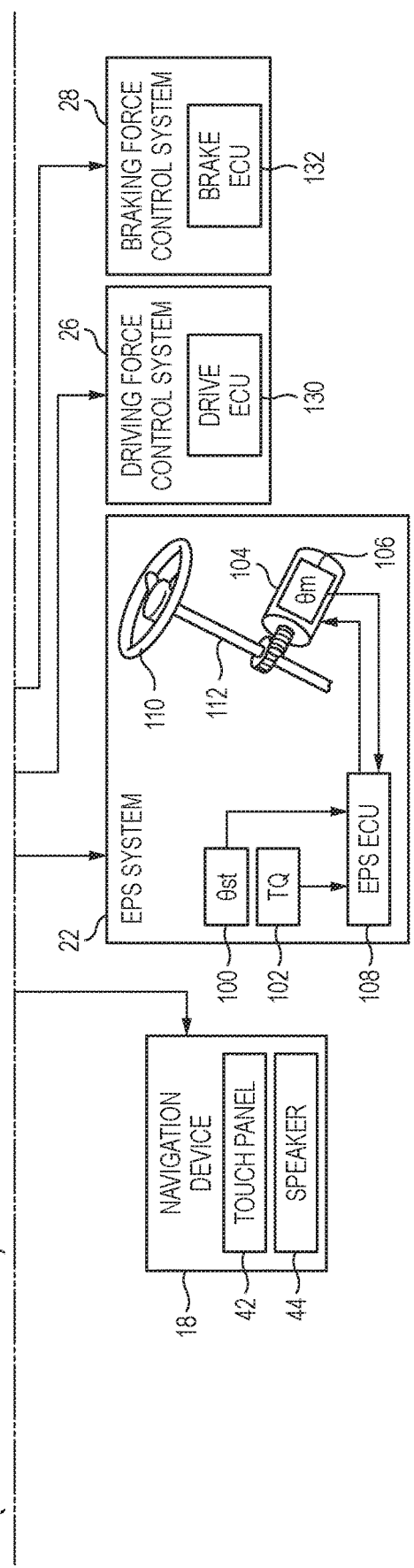

CONTROL DEVICE, CONTROL METHOD, AND STORAGE MEDIUM STORING CONTROL PROGRAM

TECHNICAL FIELD

The present invention relates to a control device, a control method, and a storage medium storing a control program.

BACKGROUND ART

In recent years, efforts have become active to provide access to a sustainable transport system that considers the most vulnerable of transport participants. To achieve such goal, inventors are focusing on research and development that will further improve traffic safety and convenience through research and development on driving support technology.

In the related arts, a technique is known in which, when a vehicle is traveling/turning, a guide line indicating a predicted travel area of the vehicle is displayed in a superimposed manner on a vehicle surrounding image based on a vehicle traveling state. For example, US2017/0272664A describes a vehicle imaging system in which when a steering angle of a vehicle towing a trailer is a certain amount, a first trajectory which is a future course/traveling curve of the vehicle and a second trajectory which is a future course/traveling curve of the trailer are calculated, and then the future course/traveling curve trajectory are displayed superimposed on image data displayed on an image display unit.

By the way, when a guide line for a vehicle and a guide line for a trailer are displayed while the vehicle is towing the trailer, the guide lines may become complicated and visibility may deteriorate. It is desirable that the visibility of the guide line be sufficiently high when the vehicle is traveling. However, US2017/0272664A does not describe reduction in visibility due to complexity of the guide lines. Therefore, there is room for improvement in the visibility of the complicated guide lines.

An object of the present invention is to provide a control device, a control method, and a storage medium storing a control program that can improve visibility of a predictive guide for a moving object or the like. This, in turn, contributes to development of a sustainable transportation system.

SUMMARY OF INVENTION

According to an aspect of the present invention, there is provided a control device includes: a movement state acquisition unit that acquires a movement state of a moving object towing a trailer; a relative position acquisition unit that acquires a relative position between the moving object and the trailer; and a display control unit that displays a first predictive guide indicating a predicted passing area of the moving object and a second predictive guide indicating a predicted passing area of the trailer, in which the display control unit changes display of at least one of the first predictive guide and the second predictive guide based on the movement state and the relative position.

According to another aspect of the present invention, there is provided a control method using a control device that includes steps executed by a processor of the control device of: acquiring a movement state of a moving object towing a trailer, acquiring a relative position between the moving object and the trailer, displaying a first predictive guide indicating a predicted passing area of the moving object and a second predictive guide indicating a predicted passing area of the trailer, and changing display of at least one of the first predictive guide and the second predictive guide based on the movement state and the relative position.

According to another aspect of the present invention, there is provided a storage medium storing a control program for a control device that causes a processor of the control device to execute processes of, acquiring a movement state of a moving object towing a trailer, acquiring a relative position between the moving object and the trailer, displaying a first predictive guide indicating a predicted passing area of the moving object and a second predictive guide indicating a predicted passing area of the trailer, and changing display of at least one of the first predictive guide and the second predictive guide based on the movement state and the relative position.

BRIEF DESCRIPTION OF DRAWINGS

FIG. 3 is a block diagram illustrating an example of an internal configuration of the vehicle illustrated in FIG. 1;

DESCRIPTION OF EMBODIMENTS

Figure 1:
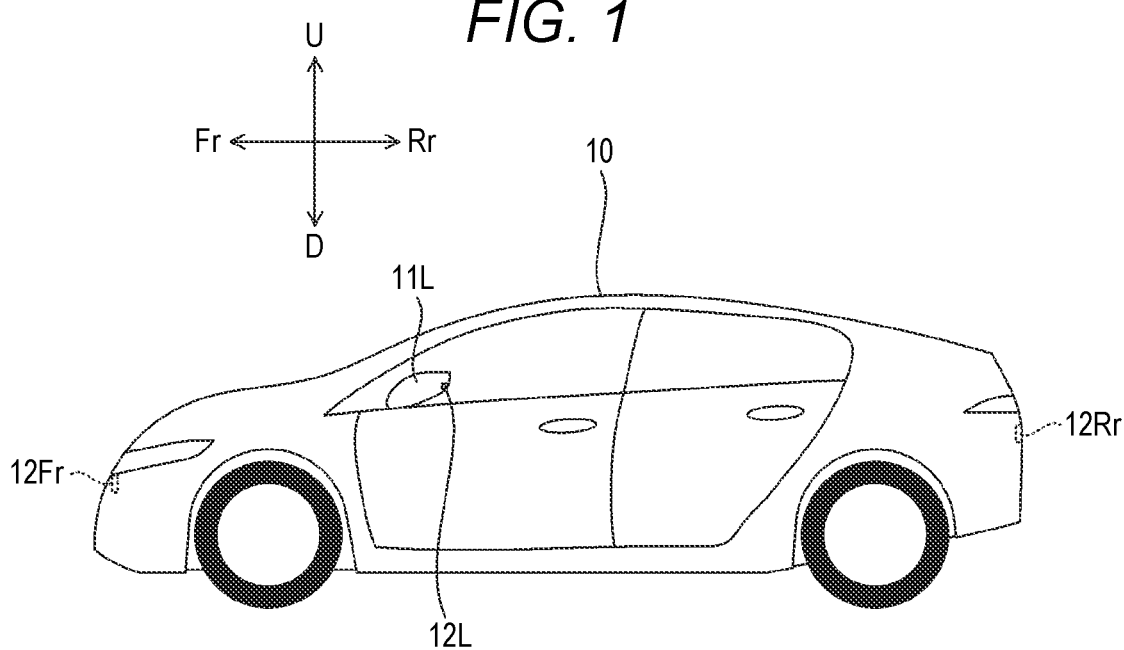
FIG. 1 is a side view illustrating an example of a vehicle equipped with a control device of the present invention.

An embodiment of a control device, a control method, and a storage medium storing a control program of the present invention will be described below with reference to the accompanying drawings. The drawings should be viewed in a direction of symbols. In the present specification and the like, to simplify and clarify the description, front and rear, left and right, and up and down directions are described according to directions seen from a driver of a vehicle 10 illustrated in FIGS. 1 and 2. In the drawings, the front of the vehicle 10 is shown as Fr, the rear as Rr, the left side as L, the right side as R, the upper side as U, and the lower side as D.

Vehicle 10 Equipped with Control Device of Present Invention

Figure 2:
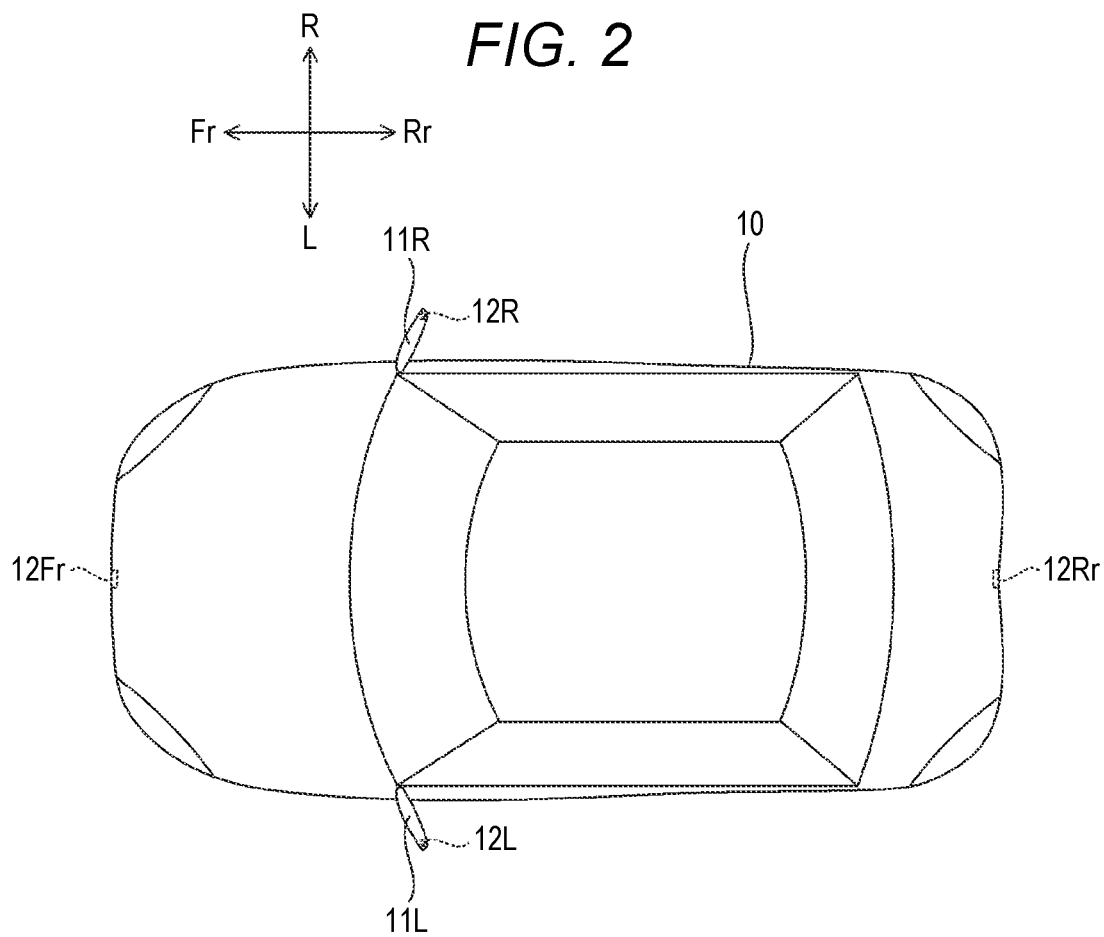
FIG. 2 is a top view of the vehicle illustrated in FIG. 1.

FIG. 1 is a side view illustrating an example of a vehicle equipped with a control device of the present invention. FIG. 2 is a top view of the vehicle illustrated in FIG. 1. The vehicle 10 is an example of a "moving object" of the present invention.

The vehicle 10 is an automobile that includes a drive source (not illustrated) and wheels including drive wheels driven by power of the drive source and steerable wheels. In the present embodiment, the vehicle 10 is a four-wheeled automobile including a pair of left and right front wheels and a pair of left and right rear wheels. The vehicle 10 is, for example, an automobile capable of towing a trailer or the like. The drive source of the vehicle 10 is, for example, an electric motor. The drive source of the vehicle 10 may be an internal combustion engine such as a gasoline engine or a diesel engine, or may be a combination of an electric motor and an internal combustion engine. The drive source of the vehicle 10 may drive the pair of left and right front wheels, the pair of left and right rear wheels, or four wheels of the pairs of left and right front wheels and rear wheels. Both of the front wheels and the rear wheels may be steerable wheels, or one pair of the wheels may be steerable wheels.

The vehicle 10 further includes side mirrors 11L and 11R. The side mirrors 11L and 11R are mirrors (rearview mirrors) provided on the outside of front seat doors of the vehicle 10 for the driver to check the rear and rear sides. The side mirrors 11L and 11R are each fixed to a main body of the vehicle 10 by vertically extending rotation shafts, and can be opened and closed by rotating around the rotation shafts.

The vehicle 10 further includes a front camera 12Fr, a rear camera 12Rr, a left side camera 12L, and a right side camera 12R. The front camera 12Fr is an imaging device (for example, a digital camera) that is provided in the front of the vehicle 10 and captures an image in a front direction of the vehicle 10. The rear camera 12Rr is a digital camera that is provided at the rear of the vehicle 10 and captures an image of a rear direction of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

Internal Configuration of Vehicle 10

FIG. 3 is a block diagram illustrating an example of an internal configuration of the vehicle illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 also includes a driving force control system 26 and a braking force control system 28.

The sensor group 16 acquires various detected values used for control by the control ECU 20. The sensor group 16 includes the front camera 12Fr, the rear camera 12Rr, the left side camera 12L, and the right side camera 12R. The sensor group 16 includes a front sonar group 32a, a rear sonar group 32b, a left side sonar group 32c, and a right side sonar group 32d. The sensor group 16 includes wheel sensors 34a and 34b, a vehicle speed sensor 36, and an operation detection unit 38.

The front camera 12Fr, the rear camera 12Rr, the left side camera 12L, and the right side camera 12R capture images of the outside world of the vehicle 10, thereby acquiring surrounding images for recognizing the vehicle 10 and surroundings thereof. Images around the vehicle 10 captured by the front camera 12Fr, rear camera 12Rr, left side camera 12L, and right side camera 12R are respectively referred to as a front image, a rear image, a left side image, and a right side image. An image composed of a left side image and a right side image may be referred to as a side image. The image of the vehicle 10 and the surroundings of the vehicle, which is generated by combining the captured images of the front camera 12Fr, the rear camera 12Rr, the left side camera 12L, and the right side camera 12R, is referred to as an overhead image of the vehicle 10.

The front sonar group 32a, the rear sonar group 32b, the left sonar group 32c, and the right sonar group 32d emit sound waves around the vehicle 10 and receive reflected sounds from other objects. The front sonar group 32a includes, for example, four sonars. The sonars forming the front sonar group 32a are respectively provided at the diagonally left front, the front left, the front right, and the diagonally front right of the vehicle 10. The rear sonar group 32b includes, for example, four sonars. The sonar forming the rear sonar group 32b are respectively provided at the diagonally rear left, the rear left, the rear right, and the diagonally rear right of the vehicle 10. The left side sonar group 32c includes, for example, two sonars. The sonars forming the left side sonar group 32c are respectively provided at the front of a left side and the rear of the left side of the vehicle 10. The right side sonar group 32d includes, for example, two sonars. The sonars forming the right side sonar group 32d are respectively provided at the front of a right side and the rear of the right side of the vehicle 10.

The wheel sensors 34a and 34b detect rotation angles of the wheels of the vehicle 10. The wheel sensors 34a and 34b may be configured by angle sensors or displacement sensors. The wheel sensors 34a and 34b output detection pulses every time the wheels rotate by a predetermined angle. The detection pulses output from the wheel sensors 34a and 34b are used to calculate the rotation angle and a rotation speed of the wheels. A distance traveled by the vehicle 10 is calculated based on the rotation angle of the wheels. The wheel sensor 34a detects, for example, a rotation angle θa of a left rear wheel. The wheel sensor 34b detects, for example, a rotation angle θb of a right rear wheel.

The vehicle speed sensor 36 detects the speed of the vehicle body of the vehicle 10, that is, a vehicle speed V, and outputs the detected vehicle speed V to the control ECU 20. The vehicle speed sensor 36 detects the vehicle speed V based on, for example, the rotation of a countershaft of a transmission. The sensor group 16 may also include, for example, a target object detection sensor capable of detecting a target object in the vicinity of the vehicle 10. Target objects include a trailer connected to (towed by) the vehicle 10, other vehicles existing around the vehicle, and the like. The target object detection sensor includes, for example, a radar, a light detection and ranging or laser imaging detection and ranging (lidar), a sonar, a yaw rate sensor, a magnetic sensor, and a steering angle sensor.

The operation detection unit 38 detects the content of an operation performed by a user using an operation input unit 14, and outputs the detected content of the operation to the brake ECU 20. The operation input unit 14 includes various user interfaces such as a side mirror switch for switching an open and closed state of the side mirrors 11L and 11R, and a shift lever (select lever or selector).

The navigation device 18 uses, for example, a global positioning system (GPS) to detect a current position of the vehicle 10 and guides the user on a route to a destination. The navigation device 18 includes a storage device (not illustrated) provided with a map information database.

The navigation device 18 is equipped with a touch panel 42 and a speaker 44. The touch panel 42 functions as an input device and a display device for the brake ECU 20. The speaker 44 outputs various types of guidance information to the user of the vehicle 10 by voice.

The touch panel 42 is configured so that various commands to the control ECU 20 can be input. For example, the user can input instructions regarding movement support for the vehicle 10 via the touch panel 42. Movement support includes parking support and exit support for the vehicle 10. The touch panel 42 is configured to display various screens related to control contents of the control ECU 20. For example, a screen related to movement support for the vehicle 10 is displayed on the touch panel 42. Specifically, the touch panel 42 displays a parking support button that requests parking support for the vehicle 10 and an exit support button that requests exit support. The parking support button includes an automatic parking button that requests parking by automatic steering of the control ECU 20, and an assistance parking button that requests assistance when parking by user operation. The exit support button includes an automatic exit button that requests exiting by automatic steering of the control ECU 20, and an assistance exit button that requests assistance when exiting by user operation. For example, on the touch panel 42, an overhead image generated by combining the captured images of the front camera 12Fr, the rear camera 12Rr, the left side camera 12L, and the right side camera 12R is displayed. A component other than the touch panel 42, for example, an information terminal such as a smartphone or a tablet, may be used as an input device or a display device.

The control ECU 20 includes an input and output unit 50, a calculation unit 52, and a storage unit 54. The calculation unit 52 is configured by, for example, a central processing unit (CPU). The calculation unit 52 performs various controls by controlling each unit based on programs stored in the storage unit 54. The calculation unit 52 inputs and outputs signals to and from each unit connected to the control ECU 20 via the input and output unit 50. The control ECU 20 is an example of the "control device" of the present invention.

The calculation unit 52 includes a movement state acquisition unit 55, a relative position acquisition unit 56, and a display control unit 57.

The movement state acquisition unit 55 acquires the movement state of the vehicle 10 that tows the trailer. The movement state acquisition unit 55 acquires a turning direction of the vehicle 10 as the movement state of the vehicle 10. The "turning direction" is a direction in which the vehicle 10 turns when moving forward or rearward, for example, to the right or to the left.

The relative position acquisition unit 56 acquires the relative position between the vehicle 10 and the trailer towed by the vehicle 10. The relative position acquisition unit 56 acquires a relative direction of the trailer with respect to the vehicle 10 as the relative position between the vehicle 10 and the trailer. The "relative direction" refers to, for example, a relative angle or a coupling angle of a trailer. The relative direction is where the vehicle trailer is relative to the vehicle 10, for example, to the right or to the left. In other words, it is the direction in which the trailer turns when the vehicle 10 moves forward.

The display control unit 57 displays a first predictive guide indicating a predicted passing area through which the vehicle 10 is predicted to pass, and a second predictive guide indicating a predicted passing area through which the trailer is predicted to pass. Based on the movement state of the vehicle 10 towing the trailer and the relative position between the vehicle 10 and the trailer, the display control unit 57 changes display of at least one of the first predictive guide for the vehicle 10 and the second predictive guide for the trailer. "Display changing" refers to changing a display mode. Changing the display mode also includes switching between display and non-display.

When the turning direction of the vehicle 10 and the relative direction of the trailer with respect to the vehicle 10 match, the display control unit 57 sets a display mode of the guide line on a side of the turning direction in the first predictive guide of the vehicle 10 to a display mode with lower visibility than a display mode of the guide line on a side opposite to the turning direction in the first predictive guide of the vehicle 10. When the turning direction of the vehicle 10 and the relative direction of the trailer with respect to the vehicle 10 match, the display control unit 57 sets a display mode of the guide line on a side opposite to the turning direction in the second predictive guide of the trailer to a display mode with lower visibility than a display mode of the guide line on a side of the turning direction in the second predictive guide. The display control unit 57 changes the display mode of the guide line, for example, when the vehicle 10 moves forward or rearward. The "side of the turning direction" refers to the inside (inner wheel side) when turning, and is the right side when turning to the right, and the left side when turning to the left. The "side opposite to the turning direction" refers to the outside (outer wheel side) when turning, and is the left side when turning to the right, and the right side when turning to the left. "Display mode with low visibility" means, for example, changing the color to a color that is difficult to see, increasing transparency, supplementing lines, changing a line type (dotted line, chain line, broken line, and the like), and hiding the display. Whether the vehicle 10 is "moving forward" or "moving rearward" is determined by the gear setting of the vehicle 10.

When the turning direction of the vehicle 10 and the relative direction of the trailer with respect to the vehicle 10 match, the display control unit 57 may display the guide line on the side opposite to the turning direction in the first predictive guide of the vehicle 10, and may hide the guide line on the side of the turning direction in the first predictive guide. When the turning direction of the vehicle 10 and the relative direction of the trailer with respect to the vehicle 10 match, the display control unit 57 may display the guide line on the side of the turning direction in the second predictive guide of the trailer, and may hide the guide line on the side opposite to the turning direction in the second predictive guide.

When the turning direction of the vehicle 10 and the relative direction of the trailer with respect to the vehicle 10 do not match, the display control unit 57 displays the guide line on the side opposite to the turning direction in the first predictive guide of the vehicle 10, and hides the guide line on the side of the turning direction in the first predictive guide. The display control unit 57 displays a guide line on the side of the turning direction and a guide line on the side opposite to the turning direction in the second predictive guide of the trailer.

The display control unit 57 switches the display of the second predictive guide for the trailer based on a map that associates the turning direction of the vehicle 10 and the relative direction of the trailer with respect to the vehicle 10 with the display mode of the second predictive guide for the trailer.

The display control unit 57 acquires a surrounding image of the vehicle 10 and displays at least one of the first predictive guide of the vehicle 10 and the second predictive guide of the trailer superimposed on the surrounding image. The "surrounding image" may be, for example, an overhead image, a 3D image, or the like. The surrounding images may be obtained by individually disposing the acquired front image, rear image, left side image, and right side image.

The display control unit 57 sets an end point position of the guide line on the side of the turning direction in the second predictive guide of the trailer to an edge of a displaying image that displays the first predictive guide of the vehicle 10 and the second predictive guide of the trailer. The "displaying image" is, for example, a surrounding image.

The display control unit 57 displays the first predictive guide of the vehicle 10 and the second predictive guide of the trailer together with a moving object image indicating the position of the vehicle 10. The moving object image is an image of the vehicle 10 displayed in the surrounding images, and is an image generated in advance to imitate the vehicle 10. A trailer image indicating the position of the trailer is also displayed in the surrounding images.

The trailer image is an image generated in advance to imitate the trailer. When the line indicating the edge opposite to the turning direction in the predicted passing area of the trailer overlaps with the moving object image, the display control unit 57 sets an end point position of the guide line on the side opposite to the turning direction in the second predictive guide of the trailer so that the guide line on the side opposite to the turning direction in the second predictive guide of the trailer does not overlap with the moving object image. The display control unit 57 sets an end point position of the guide line, for example, at a position a predetermined distance away from the moving object image (a position closer to a starting point than the moving object image).

When the line indicating the edge on a side opposite to the turning direction in the predicted passing area of the trailer does not overlap with the moving object image, the display control unit 57 sets the end point position of the guide line on the side opposite to the turning direction in the second predictive guide of the trailer to a same position as a front end of the moving object image in a traveling direction of the vehicle 10.

When the vehicle 10 moves rearward, the display control unit 57 hides the first predictive guide of the vehicle 10 and displays the guide line on a side of a relative direction of the trailer to the vehicle 10 and the guide line on a side opposite to the relative direction of the trailer to the vehicle 10 in the second predictive guide of the trailer.

When it is predicted that a traveling direction of the trailer towed by the vehicle 10 will change when the vehicle 10 moves rearward, the display control unit 57 sets the end point position of the second predictive guide of the trailer to a point where the traveling direction of the trailer changes. The "point where the traveling direction of the trailer changes" is a singular point that indicates the position where the traveling direction changes.

When it is predicted that the traveling direction of the trailer towed by vehicle 10 will not change when the vehicle 10 moves rearward, the display control unit 57 sets the end point position of the second predictive guide of the trailer to the edge of the displaying image on which the first predictive guide and the second predictive guide are displayed.

The display control unit 57 displays the first predictive guide of the vehicle 10 and the second predictive guide of the trailer on a display device included in the vehicle 10. The display device is, for example, the touch panel 42 of the navigation device 18. The display control unit 57 may display the first predictive guide of the vehicle 10 and the second predictive guide of the trailer on a display device included in an information terminal that can communicate with the vehicle 10.

The calculation unit 52 performs automatic parking support and automatic exit support for the vehicle 10 through automatic steering in which the operation of a steering wheel 110 is automatically performed under the control of the calculation unit 52. In the automatic parking support and the automatic exit support, an accelerator pedal (not illustrated), a brake pedal (not illustrated), and the operation input unit 14 are automatically operated. The calculation unit 52 also performs assistance parking support and assistance exit support when the user (driver) manually parks and manually exits the vehicle 10 by operating the accelerator pedal, the brake pedal, and the operation input unit 14. When performing the automatic parking support and the automatic exit support, the user may be in the vehicle 10, or the user may have gotten off the vehicle 10 and is outside.

For example, the calculation unit 52 performs movement control to move the vehicle 10 based on the surrounding images around the vehicle 10 obtained by the front camera 12Fr, the rear camera 12Rr, the left side camera 12L, and the right side camera 12R, and a parking space specified by the user. The movement control includes parking control that automatically parks the vehicle 10 in a predetermined parking space (target parking position) and exit control that automatically moves the vehicle 10 to leave from a predetermined parking space to a target movement position. The calculation unit 52 can perform the parking control and the exit control according to instruction signals input from the outside via the input and output unit 50. The input from the outside includes input via wireless communication from an information terminal or the like carried by the user of the vehicle 10. The calculation unit 52 can transmit information regarding the parking control and the exit control to an external information terminal via the input and output unit 50.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects torque TQ applied to the steering wheel 110.

The EPS motor 104 provides driving force or reaction force to a steering wheel column 112 connected to the steering wheel 110, thereby enabling operation support for the steering wheel 110 by an occupant and automatic steering during parking assistance. The resolver 106 detects a rotation angle θm of the EPS motor 104. The EPS ECU 108 is in charge of overall control of the EPS system 22. The EPS ECU 108 includes an input and output unit (not illustrated), a calculation unit (not illustrated), and a storage unit (not illustrated). The communication unit 24 enables wireless communication with other communication devices 120. Other communication devices 120 include base stations, communication devices of other vehicles, and information terminals such as smartphones or tablet terminals that can be carried by the user of the vehicle 10. For example, the communication unit 24 includes a UWB interface for performing ultra-wideband (UWB: registered trademark) communication with an information terminal.

The driving force control system 26 includes a drive ECU 130. The driving force control system 26 controls the driving force of the vehicle 10. The drive ECU 130 controls the driving force of the vehicle 10 by controlling an engine (not illustrated) or the like based on a user's operation of an accelerator pedal (not illustrated).

The braking force control system 28 includes a brake ECU 132. The braking force control system 28 controls the braking force of the vehicle 10. The brake ECU 132 controls the braking force of the vehicle 10 by controlling a brake mechanism (not illustrated) or the like based on a user's operation of a brake pedal (not illustrated).

Example of Guide Line Display

Next, a predictive guide showing a predicted passing area of the vehicle 10 and the trailer towed by the vehicle 10 will be described with reference to FIGS. 4 and 5.

Figure 4:
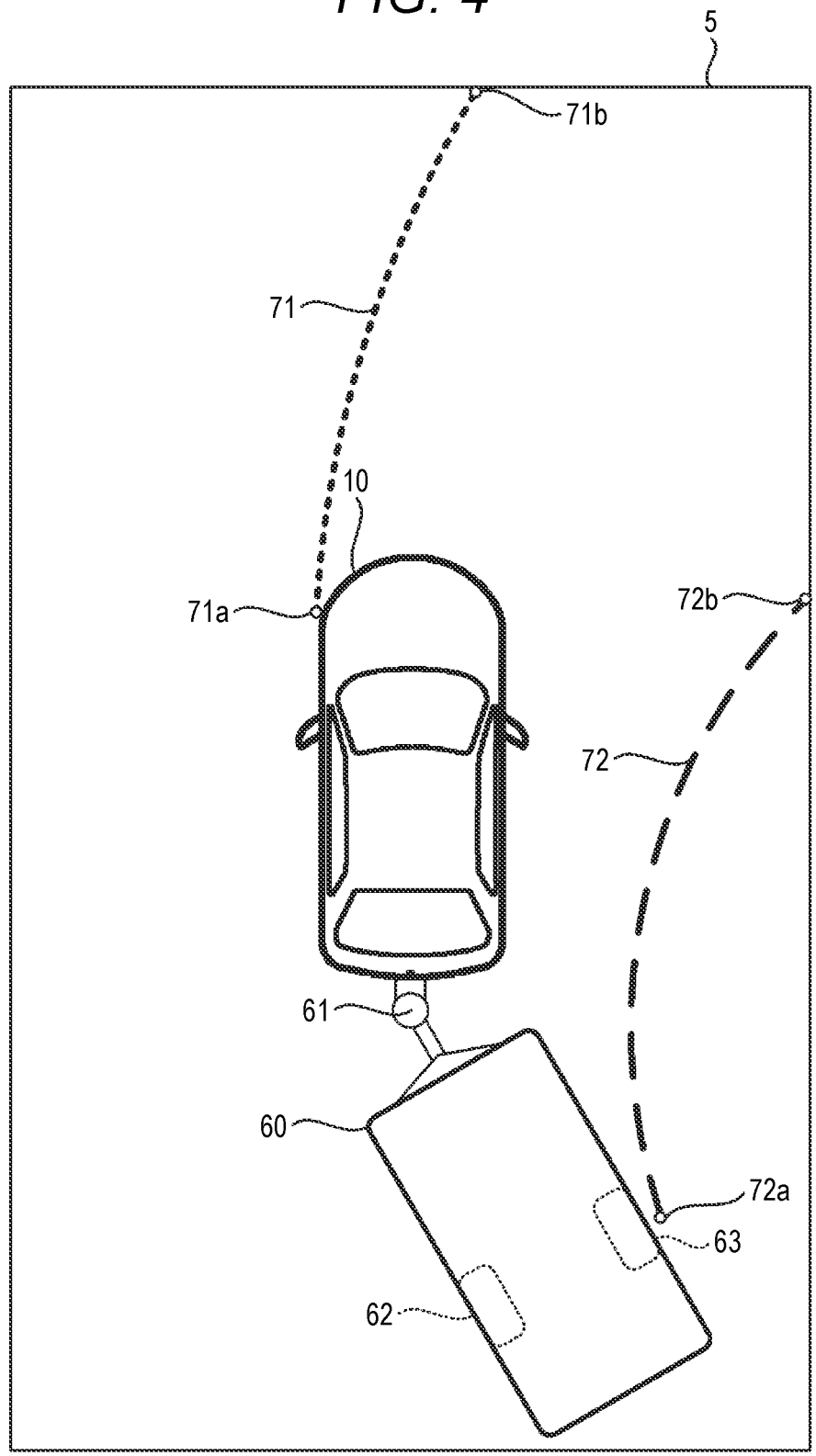
FIG. 4 is a diagram illustrating an example of guide lines of predictive guides displayed in a surrounding image of the vehicle.

FIG. 4 is a diagram illustrating an example of guide lines of predictive guides displayed in a surrounding image of a vehicle. As illustrated in FIG. 4, a surrounding image 5 of the vehicle 10 towing a trailer 60 is displayed on the touch panel 42 of the navigation device 18. The vehicle 10 is traveling forward while towing the trailer 60. The trailer 60 is connected to the vehicle 10 via a hitch ball 61. The trailer 60 is being towed by the vehicle 10 and is traveling forward like the vehicle 10. The trailer 60 is a one-wheel type trailer that has one wheel 62 on the left side and one wheel 63 on the right side.

In the vehicle 10 in the present example, the steering wheel 110 is turned to the right. The turning direction of the vehicle 10 is to the right. The relative direction of the trailer 60 with respect to the vehicle 10, that is, a direction in which the vehicle 10 exists when viewed from the trailer 60 is the right direction. Therefore, when the vehicle 10 moves forward, the trailer 60 turns to the right. In the present example, the turning direction of the vehicle 10 and the relative direction of the trailer 60 with respect to the vehicle 10 match. The vehicle 10 and the trailer 60 are both attempting to turn to the right.

Here, a guide line 71 on the side opposite to the turning direction of the vehicle 10 in the first predictive guide indicating the predicted passing area of the vehicle 10 is displayed on the vehicle 10. In the present example, since the turning direction of the vehicle 10 is rightward, the guide line 71 on a left side is displayed on the vehicle 10. The guide line 71 on the left side is a guide line on an outer side (outer wheel side) when turning. the guide line on the side of the turning direction of the vehicle 10 in the first predictive guide is not displayed on the vehicle 10. The guide line 71 on the left side of the vehicle 10 is a guide line indicating the outermost predicted passing area among the predictive guides indicating the predicted passing area including the first predictive guide showing the predicted passing area of the vehicle 10 and the second predictive guide showing the predicted passing area of the trailer 60.

On the other hand, on the trailer 60, a guide line 72 on the side of the turning direction of the vehicle 10 in the second predictive guide indicating the predicted passing area of the trailer 60 is displayed. In the present example, since the turning direction of the vehicle 10 is rightward, the guide line 72 on the right side is displayed on the trailer 60. The guide line 72 on the right side is a guide line on an inner side (inner wheel side) when turning. The guide line on the side opposite to the turning direction of the vehicle 10 in the second predictive guide is not displayed on the trailer 60. The guide line 72 on the right side of the trailer 60 is a guide line indicating the innermost predicted passing area among the predictive guides indicating the predicted passing area including the first predictive guide showing the predicted passing area of the vehicle 10 and the second predictive guide showing the predicted passing area of the trailer 60.

Here, a starting point position of the guide line 71 on the left side displayed on the vehicle 10 is a position indicating a front end of the vehicle 10. In the present example, the position of a starting point 71*a* of the guide line 71 is a position indicating a front left end of the vehicle 10. An end point position of the guide line 71 on the left side displayed on the vehicle 10 is an end of the surrounding image 5 where the guide line 71 intersects with a peripheral edge of the surrounding image 5. In the present example, a position of an end point 71*b* of the guide line 71 is a front end of the surrounding image 5.

A starting point position of the guide line 72 on the right side displayed on the trailer 60 is a position indicating an inner wheel of the trailer 60. In the present example, a position of a starting point 72*a* of the guide line 72 is a position indicating a wheel 63 on the right side. An end point position of the guide line 72 on the right side displayed on the trailer 60 is an end of the surrounding image 5 where the guide line 72 intersects with the peripheral edge of the surrounding image 5. In the present example, a position of an end point 72*b* of the guide line 72 is a right end of the surrounding image 5.

Figure 5:
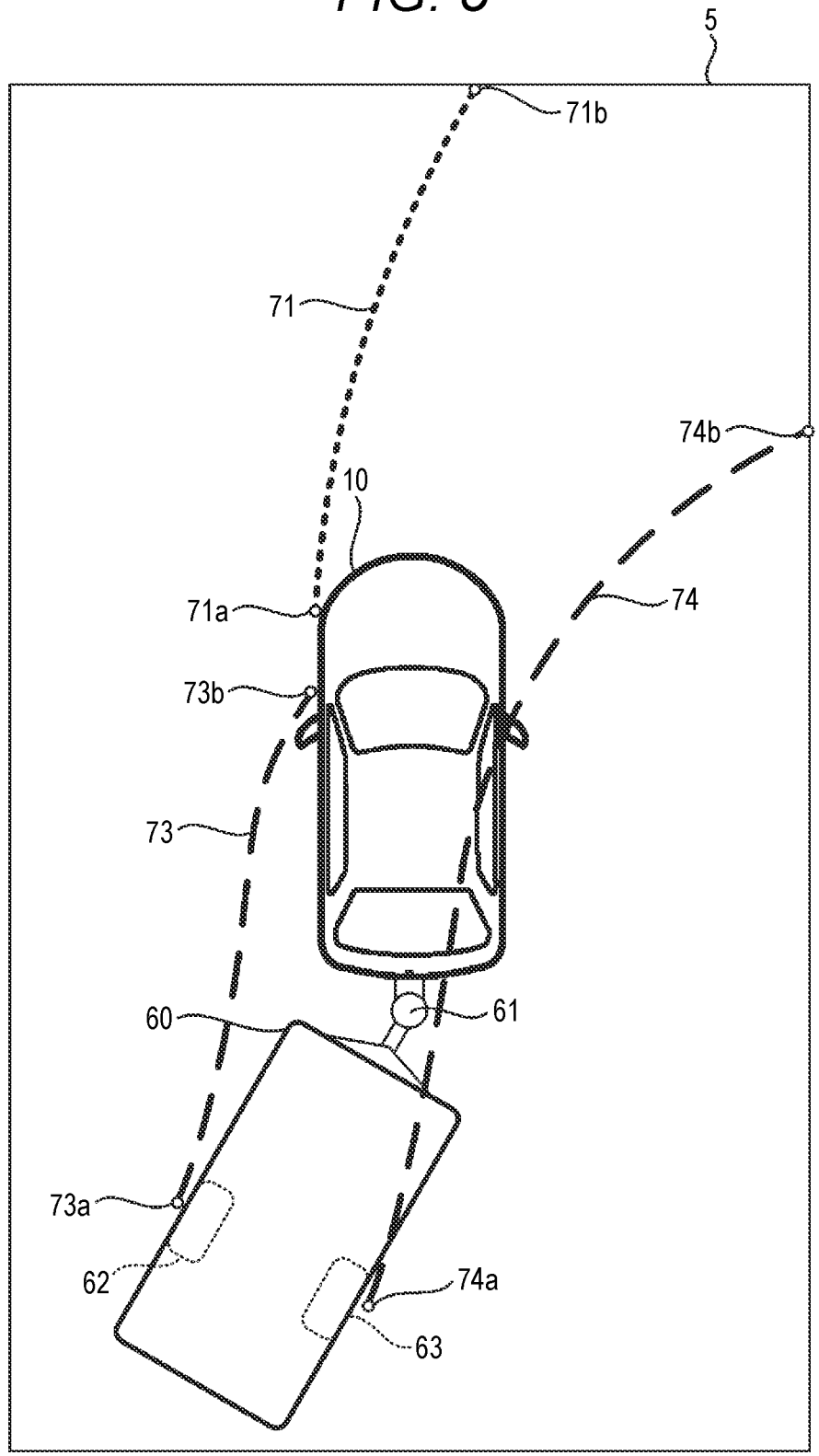
FIG. 5 is a diagram illustrating another example of the guide lines in the predictive guides displayed in the surrounding image of the vehicle.

FIG. 5 is a diagram illustrating another example of the guide lines in the predictive guides displayed in the surrounding image of the vehicle. The guide line displayed in the present example is a guide line that is displayed when the turning direction of the vehicle 10 and the relative direction of the trailer 60 with respect to the vehicle 10 do not match.

The vehicle 10 in FIG. 5 illustrates a state in which the steering wheel 110, which had been turned to the left, has been turned to the right. The trailer 60 illustrated in FIG. 5 receives traction when the vehicle 10 turns the steering wheel 110 to the left, so that the relative direction of the trailer 60 with respect to the vehicle 10 is to the left, and the trailer 60 is in a state of turning to the left.

Here, the current turning direction of the vehicle 10 is to the right, so similar to the vehicle 10 described in FIG. 4, the vehicle 10 displays only the guide line 71 on the left side, which is the side opposite to the turning direction of the vehicle 10.

On the other hand, on the trailer 60, a guide line 74 on the side of the turning direction of the vehicle 10 in the second predictive guide indicating the predicted passing area of the trailer 60 and a guide line 73 on the side opposite to the turning direction of the vehicle 10 in the second predictive guide are displayed. In the present example, since the turning direction of the vehicle 10 is rightward, the guide line 74 on the right side and the guide line 73 on the left side are displayed on the trailer 60.

The guide line 73 is an inner guide line of the second predictive guide of the trailer 60 at a current point in time. The guide line 74 is an outer guide line of the second predictive guide of the trailer 60 at the current point in time. The current point in time is a point in time when the turning direction of the vehicle 10 and the relative direction of the trailer 60 with respect to the vehicle 10 do not match. When the vehicle 10 moves further to the right from the state illustrated in FIG. 5, the turning direction of the vehicle 10 and the relative direction of the trailer 60 with respect to the vehicle 10 come to match, so then, the guide line will be displayed as illustrated in FIG. 4.

Here, the starting point position and the end point position of the guide line 71 on the left side displayed on the vehicle 10 are a position of the starting point 71a and a position of the end point 71b, as in the case of FIG. 4.

The starting point position of the guide line 73 on the left side displayed on the trailer 60 is a position indicating the inner wheel of the trailer 60. In the present example, a position of a starting point 73a of the guide line 73 is a position indicating the wheel 62 on the left side. The end point position of the guide line 73 on the left side displayed on the trailer 60 is set at a position where the guide line 73 does not overlap the vehicle 10. In the present example, the position of an end point 73b of the guide line 73 is slightly in front of the left side of the vehicle 10. The starting point position of the guide line 74 on the right side displayed on the trailer 60 is a position indicating the outer wheel of the trailer 60. In the present example, a position of a starting point 74a of the guide line 74 is a position indicating the wheel 63 on the right side. The end point position of the guide line 74 on the right side displayed on the trailer 60 is an end of the surrounding image 5 where the guide line 74 intersects with the peripheral edge of the surrounding image 5. In the present example, a position of an end point 74b of the guide line 74 is a right end of the surrounding image 5.

Displaying Guide Line Based on Map

Figure 6:
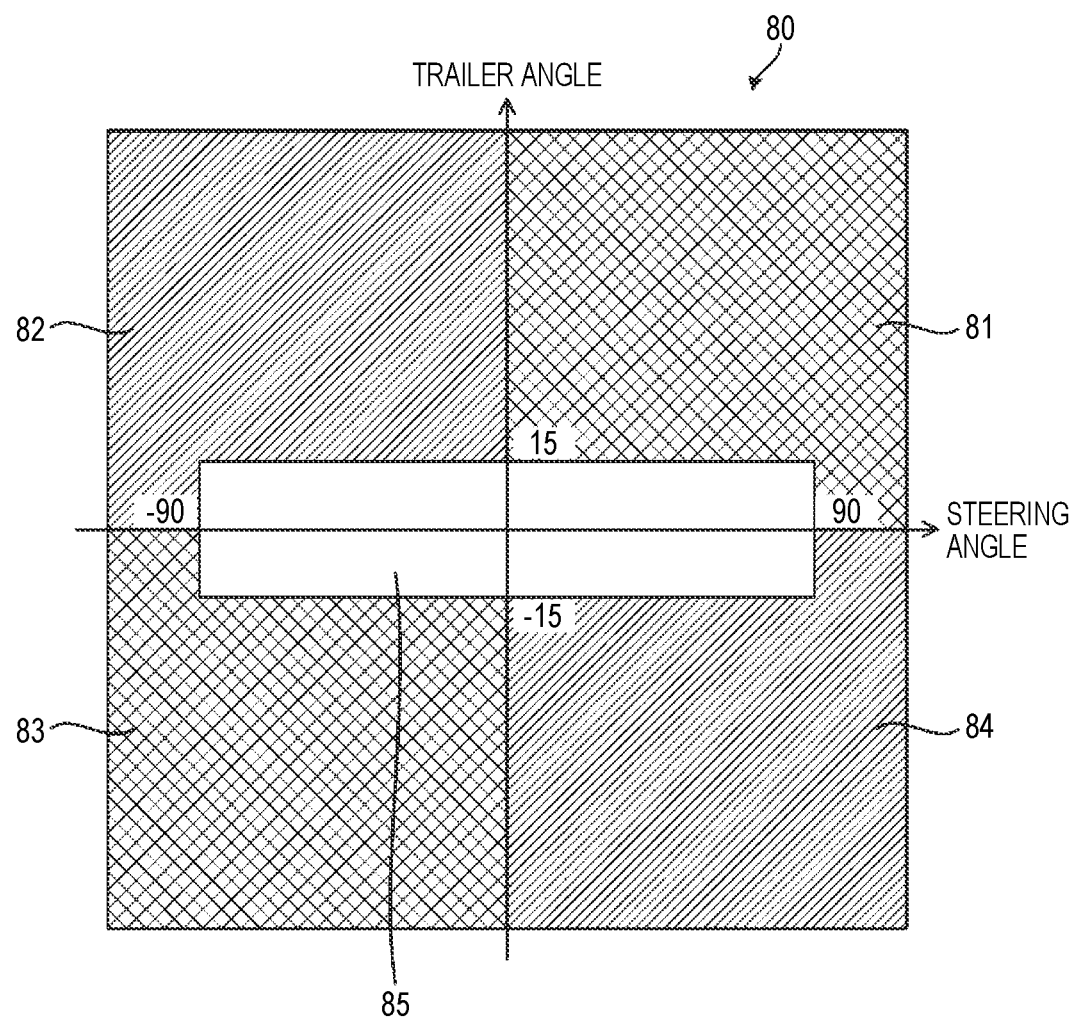
FIG. 6 is a diagram illustrating an example of a map for changing display of the predictive guide for a trailer.

FIG. 6 is a diagram illustrating an example of a map for changing display of the predictive guide for the trailer. A map 80 illustrated in FIG. 6 is a map in which a horizontal axis represents a steering angle of the vehicle 10 and a vertical axis represents a trailer angle of the trailer 60. The steering angle is the turning direction of the vehicle 10, that is, the direction in which the vehicle 10 moves. The trailer angle is the relative direction of the trailer 60 with respect to the vehicle 10, that is, the direction in which the trailer 60 is traveling.

A first quadrant 81 of the map 80 is an area where the steering angle of the vehicle 10 is to the right and the trailer angle of the trailer 60 is to the right. That is, the first quadrant is a region where the turning direction of the vehicle 10 and the relative direction of the trailer 60 with respect to the vehicle 10 both match in the right direction. A second quadrant 82 is an area where the steering angle of the vehicle 10 is to the left and the trailer angle of the trailer 60 is to the right. That is, the second quadrant is a region where the turning direction of the vehicle 10 and the relative direction of the trailer 60 with respect to the vehicle 10 do not match. A third quadrant 83 is an area where the steering angle of the vehicle 10 is to the left and the trailer angle of the trailer 60 is to the left. That is, the third quadrant is a region where the turning direction of the vehicle 10 and the relative direction of the trailer 60 with respect to the vehicle 10 both match in the left direction. A fourth quadrant 84 is an area where the steering angle of the vehicle 10 is to the right and the trailer angle of the trailer 60 is to the left. That is, the fourth quadrant is a region where the turning direction of the vehicle 10 and the relative direction of the trailer 60 with respect to the vehicle 10 do not match.

The map 80 is a map that associates the turning direction of the vehicle 10, the relative direction of the trailer 60 with respect to the vehicle 10, and the display mode of the second predictive guide of the trailer 60. When the turning direction of the vehicle 10 and the relative direction of the trailer 60 with respect to vehicle 10 are in the first quadrant 81 of the map 80, the display control unit 57 displays, as a guide line for the trailer 60, a guide line on the side of the turning direction of the vehicle 10 in the second predictive guide indicating the predicted passing area of the trailer 60.

Similarly, when the directions are in the second quadrant 82, the display control unit 57 displays a guide line on the side of the turning direction of the vehicle 10 in the second predictive guide of the trailer 60 and a guide line on the side opposite to the turning direction of the vehicle 10 in the second predictive guide. Similarly, when the directions are in the third quadrant 83, the display control unit 57 displays a guide line on the side of the turning direction of the vehicle 10 in the second predictive guide of the trailer 60. Similarly, when the directions are in the fourth quadrant 84, the display control unit 57 displays a guide line on the side of the turning direction of the vehicle 10 in the second predictive guide of the trailer 60 and a guide line on the side opposite to the turning direction of the vehicle 10 in the second predictive guide.

When the turning direction of the vehicle 10 is 90 degrees or less left and right, and the relative direction of the trailer 60 with respect to the vehicle 10 is 15 degrees or less left and right (in area 85 of the map 80), that is, when the trailer angle is small, the display control unit 57 hides the guide line of the trailer 60. In the present example, the map 80 to which the display mode of the second predictive guide of the trailer 60 is associated is described, but the present invention is not limited thereto. For example, as in the examples described in FIGS. 4 and 5, the map 80 may be a map in which both the display mode of the second predictive guide of the trailer 60 and the display mode of the first predictive guide of the vehicle 10 are associated with each other.

Starting Point of Guide Line

Next, the starting point of the guide line in the second predictive guide of the trailer 60 will be described with reference to FIGS. 7 and 8.

Figure 7:
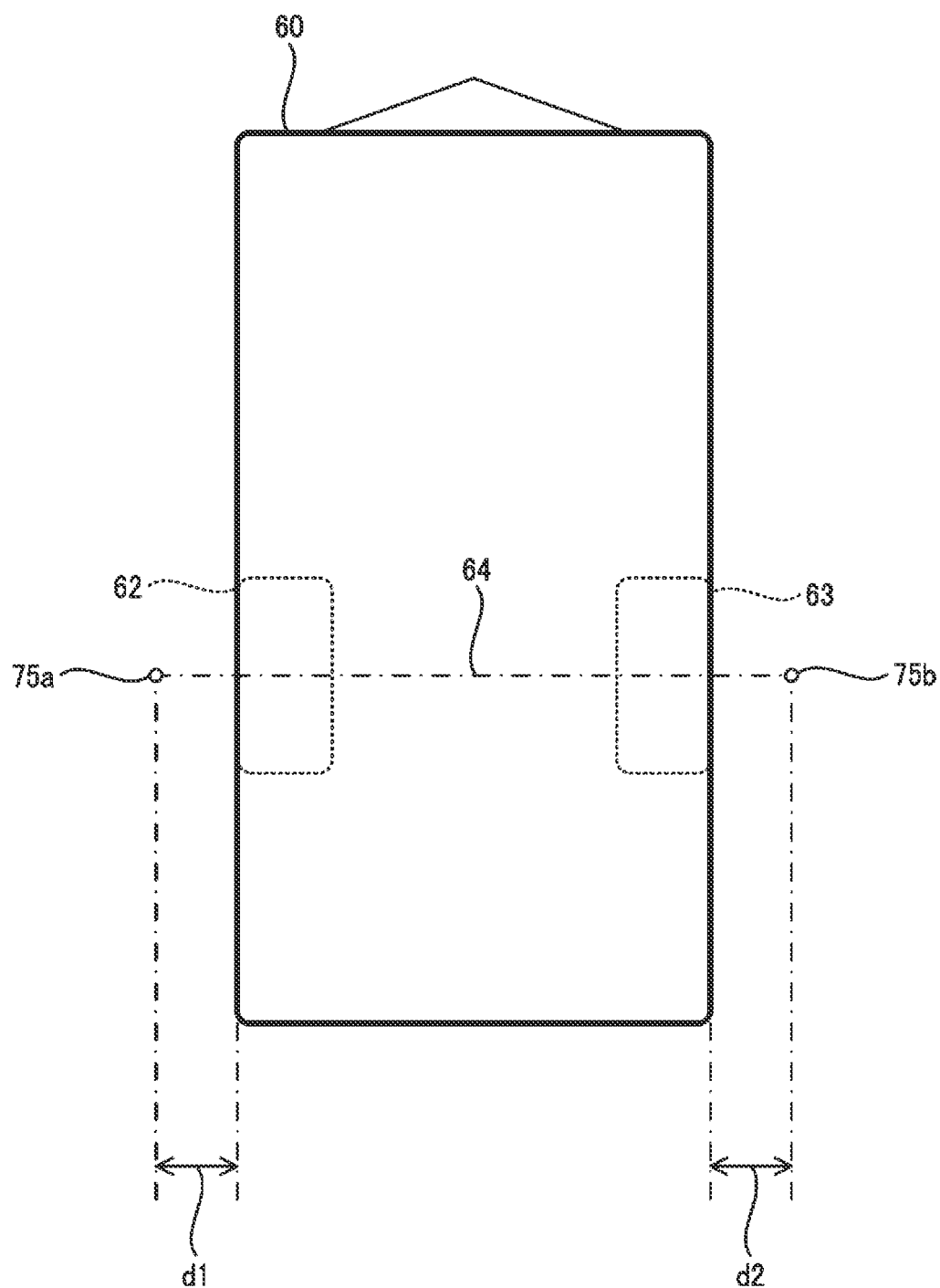
FIG. 7 is a diagram illustrating a starting point of the guide line in a single-wheel type trailer.

FIG. 7 is a diagram illustrating the starting point of a guide line in a single-wheel type trailer. As illustrated in FIG. 7, the trailer 60 of the single-wheel type includes one wheel 62 on the left side and one wheel 63 on the right side. In the case of the trailer 60 of the single-wheel type, a position of a starting point 75a of the guide line of the left side in the second predictive guide is set at a predetermined distance d1 (for example, 0.25 m) away from a left end of the trailer 60 at a center position 64 of the wheel 62 in a front-rear direction of the trailer 60. A position of a starting point 75b of the guide line on the right side in the second predictive guide is set at a predetermined distance d2 (for example, 0.25 m) away from a right end of the trailer 60 at the center position 64 of the wheel 63 in the front-rear direction of the trailer 60.

Figure 8:
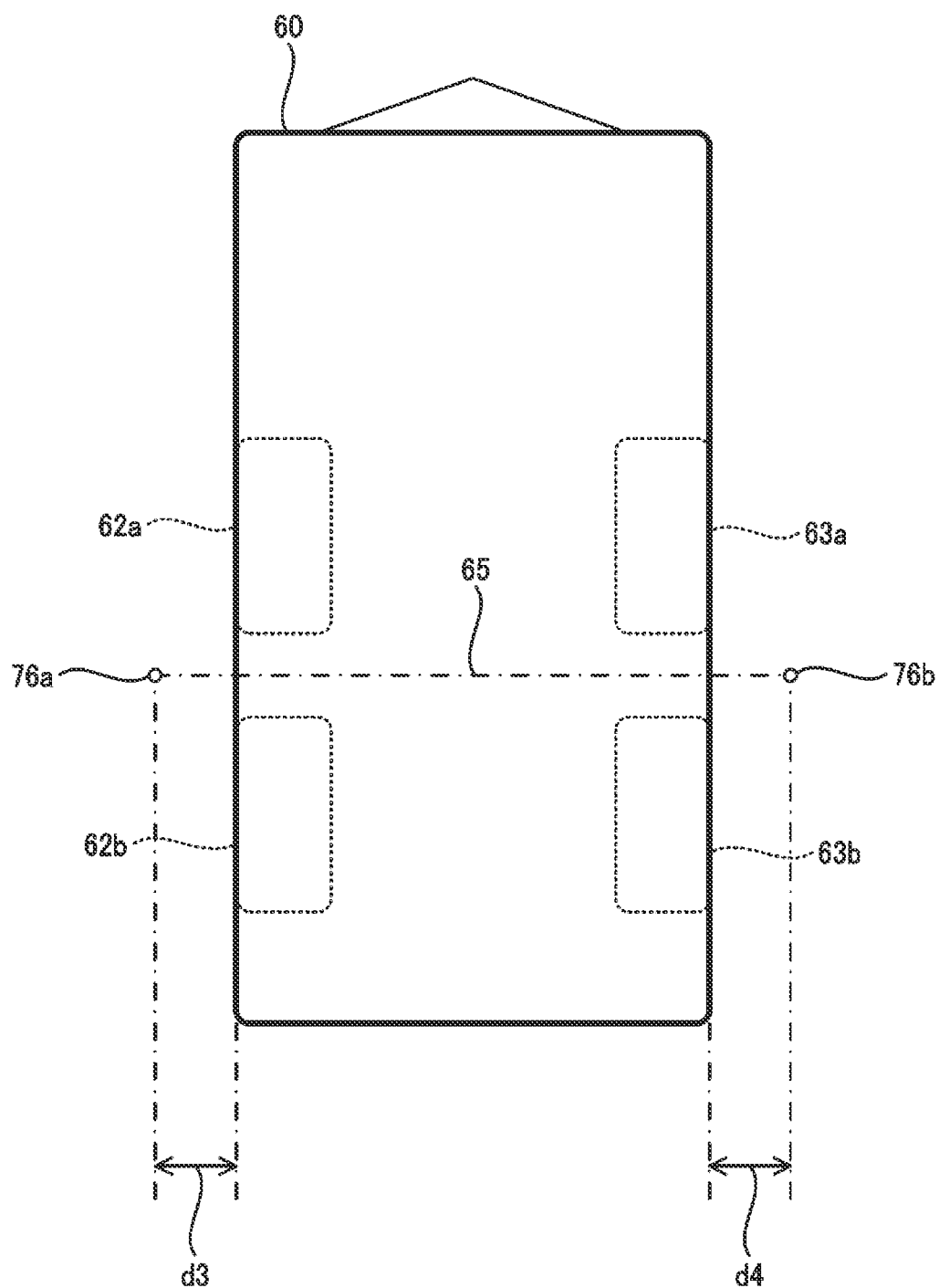
FIG. 8 is a diagram illustrating a starting point of the guide line in a two-wheel type trailer.

FIG. 8 is a diagram illustrating a starting point of a guide line in a two-wheel type trailer. As illustrated in FIG. 8, the trailer 60 of the two-wheel type includes two wheels 62a and 62b on the left side and two wheels 63a and 63b on the right side. In the case of the trailer 60 of the two-wheel type, a position of a starting point 76a of the guide line on the left side in the second predictive guide is set at a central position 65 between the wheels 62a and 62b in the front-rear direction of the trailer 60, and a predetermined distance d3 (for example, 0.25 m) away from the left end of the trailer 60. A position of a starting point 76b of the guide line on the right side in the second predictive guide is set at the center position 65 between the wheels 63a and 63b in the front-rear direction of the trailer 60, and a predetermined distance d4 (for example, 0.25 m) away from the right end of the trailer 60.

End Point of Guide Line

Next, an end point of a guide line in the second predictive guide of the trailer 60 will be described with reference to FIGS. 9 and 10.

Figure 9:
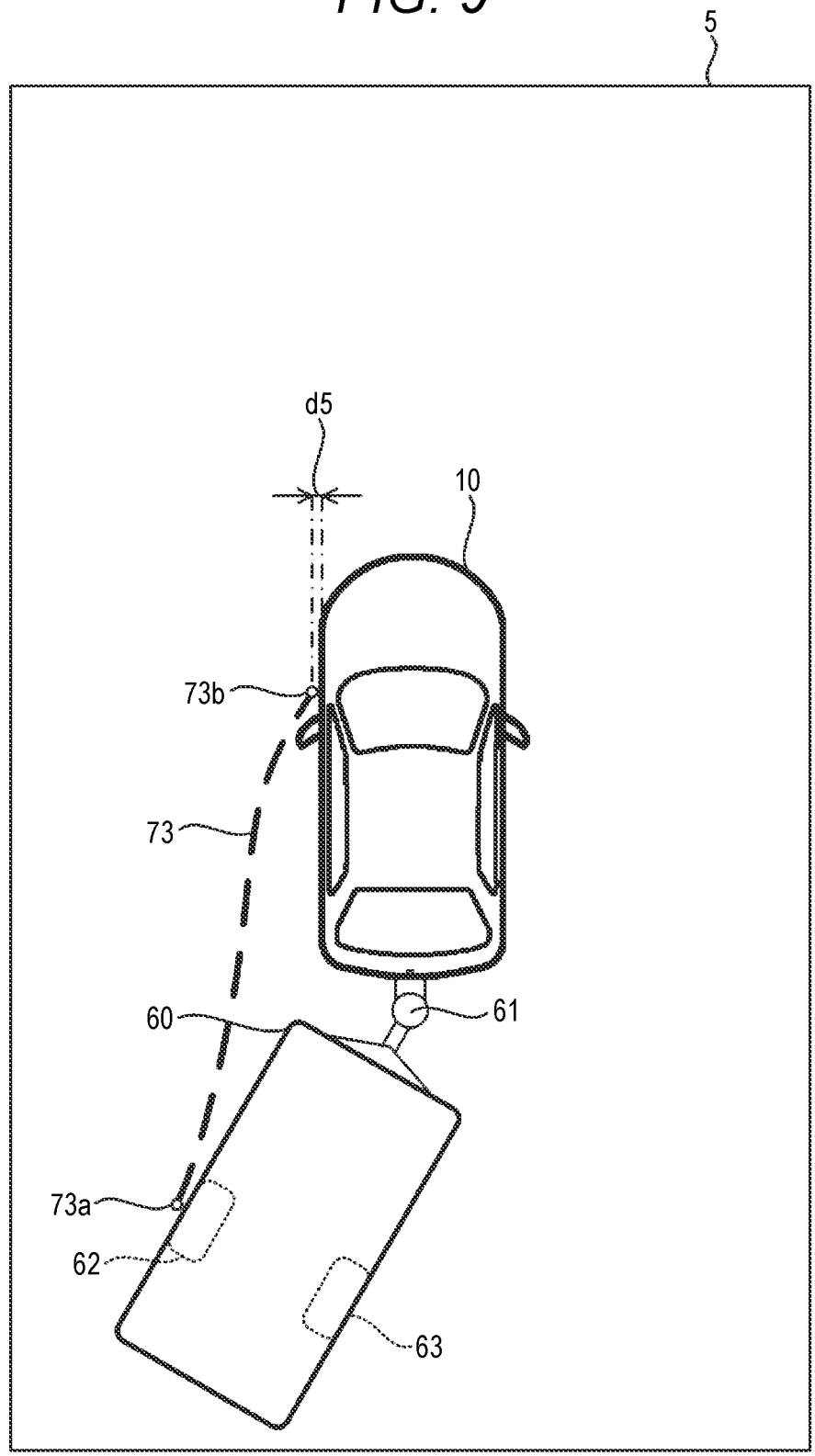
FIG. 9 is a diagram illustrating an end point of the guide line when a line indicating an end of a predicted passing area of the trailer overlaps a moving object image indicating the vehicle.

FIG. 9 is a diagram illustrating an end point of a guide line when a line indicating the end of the predicted passing area of the trailer overlaps the moving object image indicating the vehicle. The guide line 73 displayed on the left side of the trailer 60 illustrated in FIG. 9 is a guide line that is displayed in the same state as the guide line 73 described in FIG. 5.

As illustrated in FIG. 9, when the passing position of the guide line 73 is predicted to overlap the moving object image of the vehicle 10, the position of the end point 73b of the guide line 73 is set to not overlap the moving object image of the vehicle 10. Specifically, the end point 73b of the guide line 73 is set at a predetermined distance d5 (for example, 0.25 m) away from the left end of the moving object image of the vehicle 10.

Figure 10:
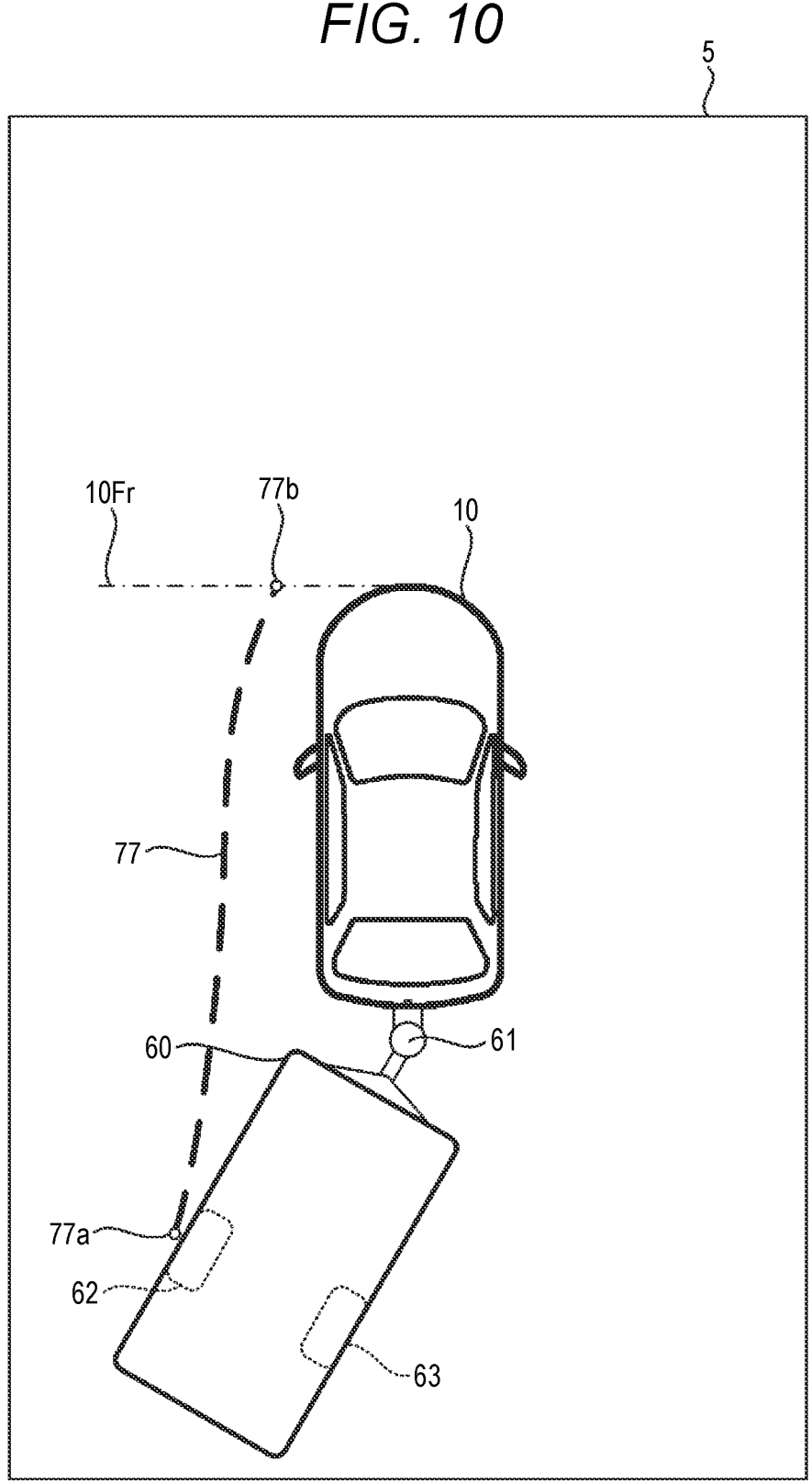
FIG. 10 is a diagram illustrating the end point of the guide line when the line indicating the end of the predicted passing area of the trailer does not overlap with the moving object image indicating the vehicle.

FIG. 10 is a diagram illustrating an end point of a guide line when a line indicating the end of the predicted passing area of the trailer does not overlap with the moving object image indicating the vehicle. The vehicle 10 and the trailer 60 illustrated in FIG. 10 are in the same state as the vehicle 10 and the trailer 60 illustrated in FIG. 9 in the turning direction of the vehicle 10 and the relative direction of the trailer 60 with respect to the vehicle 10, but FIG. 10 is a case where it is predicted that a passing position of a guide line 77 displayed on the left side of the trailer 60 will not overlap with the moving object image of the vehicle 10.

When it is predicted that the passing position of the guide line 77 will not overlap the moving object image of the vehicle 10, a position of an end point 77b, which is an end of the guide line 77 in a traveling direction of the vehicle 10, is set to be the same as a vehicle front end position 10Fr indicating a front end position of the moving object image of the vehicle 10. A first predictive guide indicating the predicted passing area of the vehicle 10 is displayed ahead of the vehicle front end position 10Fr.

Example of Guide Line Display when Moving Rearward

Figure 11:
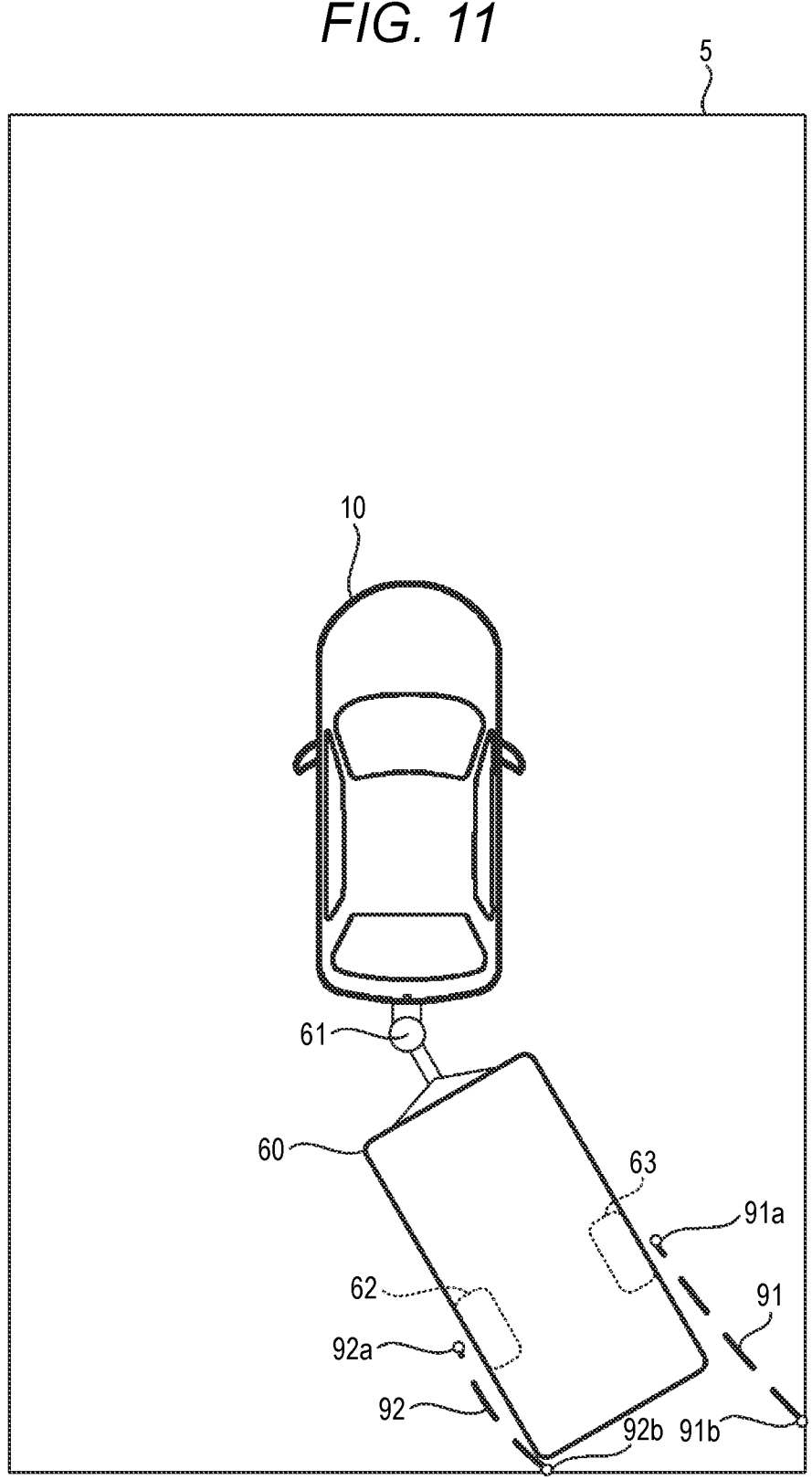
FIG. 11 is a diagram illustrating an example of the guide lines displayed when the vehicle towing the trailer moves rearward.

FIG. 11 is a diagram illustrating an example of guide lines displayed when the vehicle towing the trailer moves rearward. In the vehicle 10 illustrated in FIG. 11, for example, the steering wheel 110 is turned to the right. The turning direction in which the vehicle 10 moves rearward is to the right. The relative direction of the trailer 60 with respect to the vehicle 10, that is, the direction in which the vehicle 10 exists when viewed from the trailer 60 is the right direction. Therefore, when the vehicle 10 moves rearward, the trailer 60 moves rearward while turning to the right. In the present example, the turning direction of the vehicle 10 and the relative direction of the trailer 60 with respect to the vehicle 10 match. The vehicle 10 and the trailer 60 are both moving rearward and attempting to turn to the right. The present example is a guide line for a case where the traveling direction of the trailer 60 is predicted to continue in a certain direction (to the right) without changing (without switching) when the vehicle 10 moves rearward.

Here, as illustrated in FIG. 11, on the trailer 60, a guide line 91 on the side of the relative direction of the trailer 60 with respect to the vehicle 10 and a guide line 92 on the side opposite to the relative direction of the trailer 60 with respect to the vehicle 10 in the second predictive guide indicating the predicted passing area of the trailer 60 are displayed. The guide line 91 is a guide line displayed on the inner wheel side (in the present example, the right side) of the trailer 60. The guide line 92 is a guide line displayed on the outer wheel side (in the present example, the left side) of the trailer 60. For the vehicle 10, the first predictive guide indicating the predicted passing area of the vehicle 10 is not displayed.

A position of a starting point 91a of the guide line 91 on the right side displayed on the trailer 60 is a position indicating the wheel 63 on the right side of the trailer 60. A position of a starting point 92a of the guide line 92 on the left side displayed on the trailer 60 is a position indicating the wheel 62 on the left side of the trailer 60. In the present example, a position of an end point 91b of the guide line 91 on the right side displayed on the trailer 60 is a position where the guide line 91 intersects with the right end of the surrounding image 5. In the present example, a position of an end point 92b of the guide line 92 on the left side displayed on the trailer 60 is a position where the guide line 92 intersects with the lower end of the surrounding image 5.

Other Examples of Guide Line Display when Moving Rearward

The display of guide lines when the turning direction of the vehicle 10 and the relative direction of the trailer 60 with respect to the vehicle 10 do not match when the vehicle 10 moves rearward will be described with reference to FIGS. 12 and 13.

Figure 12:
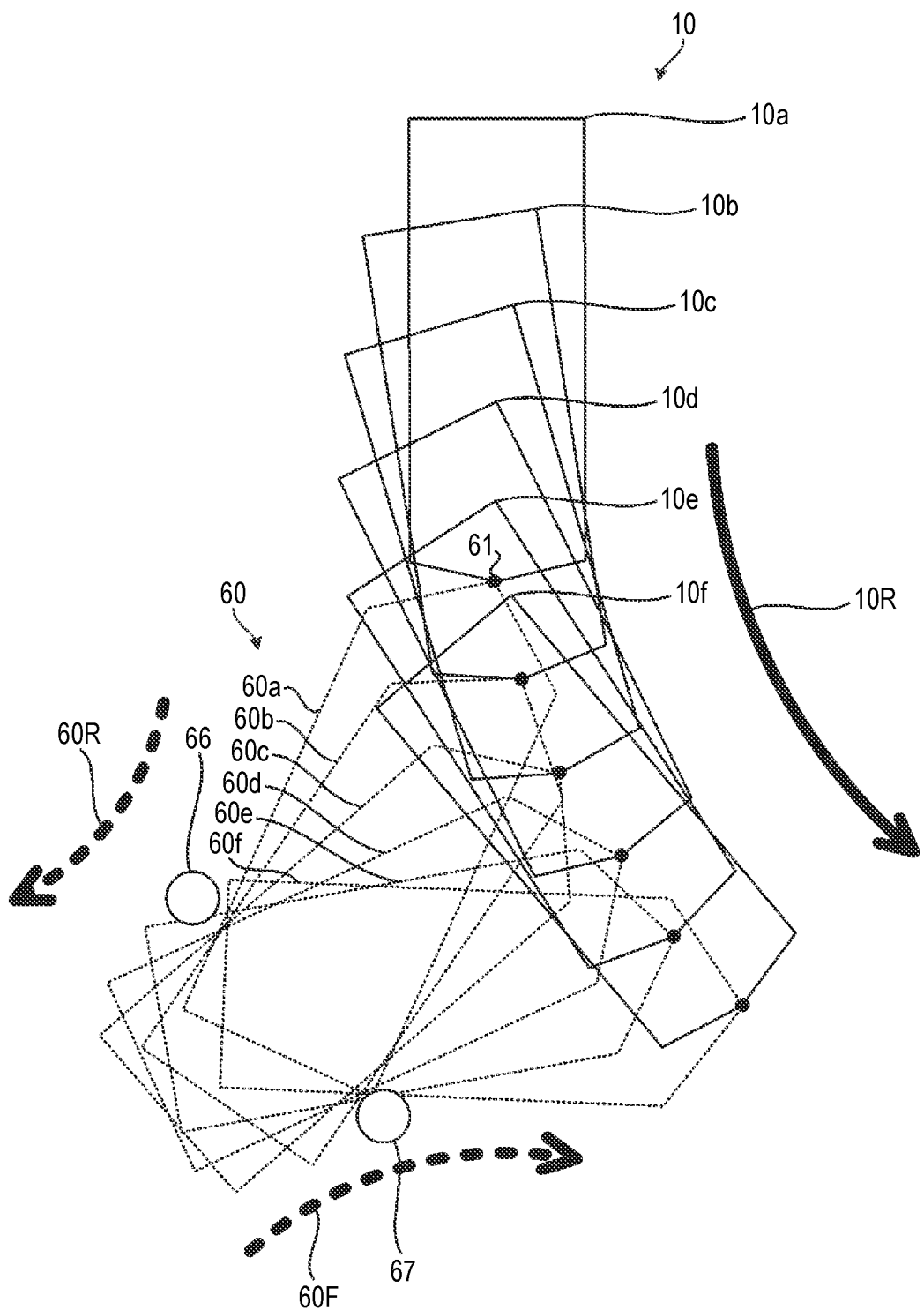
FIG. 12 is a diagram illustrating an example of predicted trajectories of the vehicle and the trailer calculated by a control ECU when the vehicle moves rearward.

FIG. 12 is a diagram illustrating an example of predicted trajectories of the vehicle and the trailer calculated by the control ECU when the vehicle moves rearward. In the vehicle 10 illustrated in FIG. 12, the steering wheel 110 is turned to the right. The turning direction in which the vehicle 10 moves rearward is to the right. The relative direction of the trailer 60 with respect to the vehicle 10, that is, the direction in which the vehicle 10 exists when viewed from the trailer 60 is the left direction. Therefore, when the vehicle 10 moves rearwards, the trailer 60 moves rearward while turning to the left. The present example shows predicted trajectories of the vehicle and the trailer when the turning direction of the vehicle 10 and the relative direction of the trailer 60 with respect to the vehicle 10 do not match.

The vehicle 10 moves to the right from a position of a vehicle 10a to positions of vehicles 10b, 10c, 10d, 10e, and 10f sequentially along a rearward traveling direction 10R indicated by an arrow. On the other hand, the trailer 60 first moves leftward from a position of a trailer 60a to positions of trailers 60b and 60c sequentially along the rearward traveling direction 60R indicated by the arrow. Then, the traveling direction of the trailer 60 switches from the reverse traveling direction to a forward traveling direction at the position of the trailer 60c, and then along a forward traveling direction 60F indicated by an arrow, the trailer 60 moves rightward from the position of the trailer 60c to positions of trailers 60d, 60e, and 60f sequentially. The control ECU 20 sets points at which the traveling direction of the trailer 60 is switched to, for example, singular points 66 and 67 as end point positions of the second predictive guide of the trailer 60. As such, the trajectory of the trailer 60 of which the traveling direction is switched can be used as a predicted trajectory when accommodating the trailer 60 towed by the vehicle 10 in a predetermined accommodation location, for example.

Figure 13:
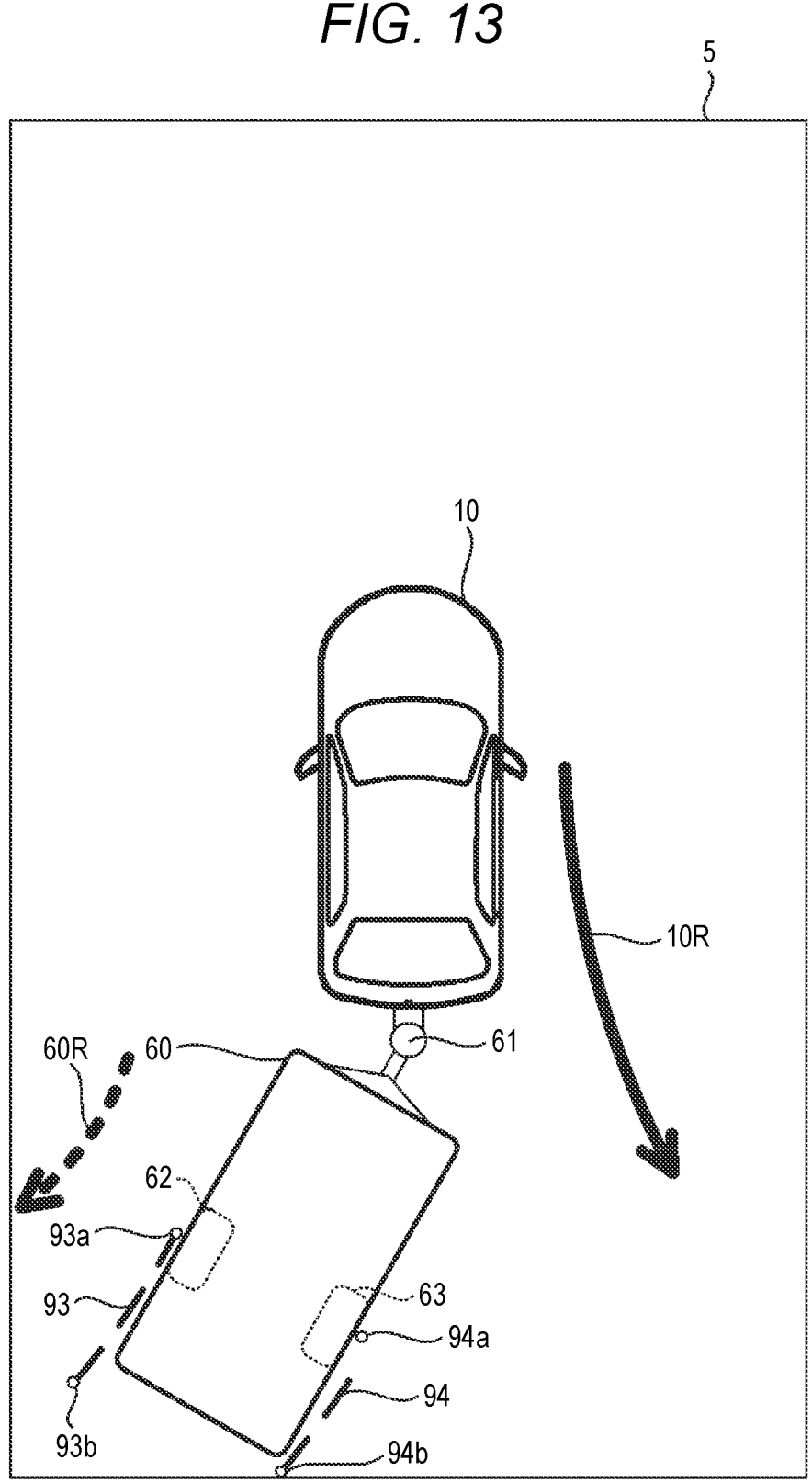
FIG. 13 is a diagram illustrating an example of the guide lines that are displayed when a turning direction of the vehicle and a relative direction of the trailer with respect to the vehicle do not match when the vehicle moves rearward.

FIG. 13 is a diagram illustrating an example of the guide lines that are displayed when the turning direction of the vehicle and the relative direction of the trailer with respect to the vehicle do not match when the vehicle moves rearward. The vehicle 10 illustrated in FIG. 13 is moving to the right along the rearward traveling direction 10R, similar to the case described in FIG. 12. When the vehicle 10 moves to the right, the trailer 60 moves to the left along the rearward traveling direction 60R.

Here, as illustrated in FIG. 13, on the trailer 60, a guide line 93 on a side in the relative direction of the trailer 60 with respect to the vehicle 10 and a guide line 94 on a side opposite to the relative direction of the trailer 60 with respect to the vehicle 10 in the second predictive guide indicating the predicted passing area of the trailer 60 are displayed. The guide line 93 is a guide line displayed on the inner wheel side (in the present example, the left side) of the trailer 60. The guide line 94 is a guide line displayed on the outer wheel side (in the present example, the right side) of the trailer 60. For the vehicle 10, the first predictive guide indicating the predicted passing area of the vehicle 10 is not displayed.

The position of a starting point 93a of the guide line 93 on the left side displayed on the trailer 60 is a position indicating the wheel 62 on the right side of the trailer 60. A position of a starting point 94a of the guide line 94 on the right side displayed on the trailer 60 is a position indicating the wheel 63 on the right side of the trailer 60. A position of an end point 91b of the left guide line 93 on the left side displayed on the trailer 60 is a position of the singular point 66 illustrated in FIG. 12. A position of an end point 94b of the guide line 94 on the right side displayed on the trailer 60 is a position of the singular point 67 illustrated in FIG. 12.

Modification Example of Guide Line Display

Figure 14:
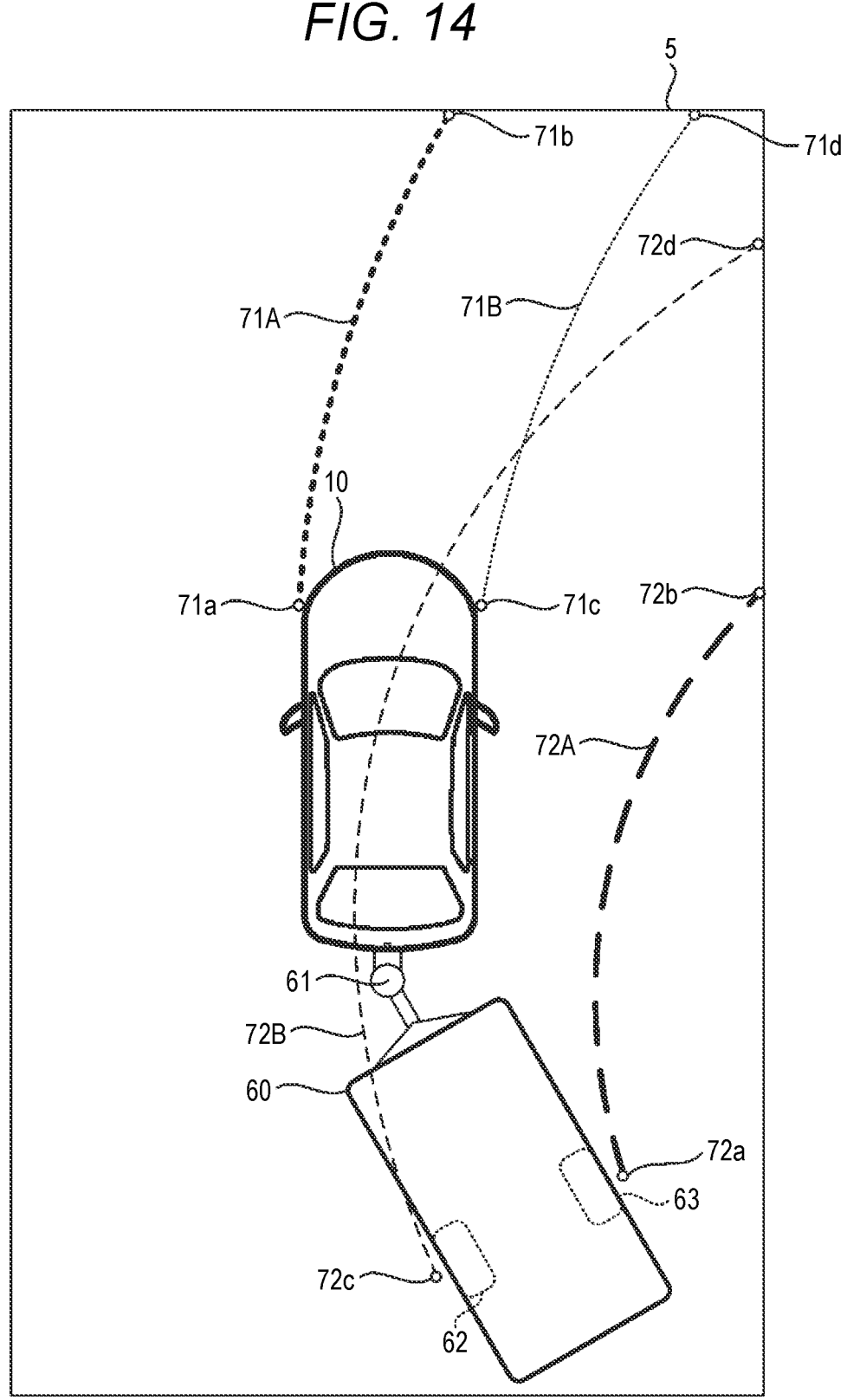
FIG. 14 is a diagram illustrating a modification example of guide lines of predictive guides displayed in a surrounding image of a vehicle.

FIG. 14 is a diagram illustrating a modification example of the guide lines of the predictive guides displayed in the surrounding image of the vehicle. Comparing with the guide line display described in FIG. 4, the guide line display in the present modification example is different in that the guide line on the side in the turning direction (right side) of the vehicle 10 in the vehicle 10 and the guide line on the side opposite to the turning direction (left side) of the vehicle 10 in the trailer 60 that were hidden in FIG. 4 are not hidden in the present modification example. The turning direction of the vehicle 10 and the relative direction of the trailer 60 with respect to the vehicle 10 illustrated in FIG. 14 are in the same state as those of the vehicle 10 and the trailer 60 illustrated in FIG. 4.

As illustrated in FIG. 14, on the vehicle 10, a guide line 71A on a side opposite to the turning direction of the vehicle 10 and a guide line 71B on a side of the turning direction in the first predictive guide indicating the predicted passing area of the vehicle 10 are displayed. In the present example, since the turning direction of the vehicle 10 is rightward, the guide line 71A on the left side (outer wheel side) and the guide line 71B on the right side (inner wheel side) are displayed on the vehicle 10. The guide line 71B on the side of the turning direction of the vehicle 10 is displayed in a display mode with lower visibility than the guide line 71A on the side opposite to the turning direction. In the present example, the guide line 71B is displayed as a thinner line than the guide line 71A.

On the trailer 60, a guide line 72A on a side of the turning direction of the vehicle 10 and a guide line 72B on a side opposite to the turning direction in the second predictive guide indicating the predicted passing area of the trailer 60 are displayed. In the present example, since the turning direction of the vehicle 10 is rightward, the guide line 72A on the right side (inner wheel side) and the guide line 72B on the left side (outer wheel side) are displayed on the trailer 60. The guide line 72B on the side opposite to the turning direction of the vehicle 10 is displayed in a display mode with lower visibility than the guide line 72A on the side of the turning direction. In the present example, the guide line 72B is displayed as a thinner line than the guide line 72A.

Here, a position of a starting point 71c of the guide line 71B on the right side displayed on the vehicle 10 is a position indicating a front right end of the vehicle 10. An end point 71d of the guide line 71B is located at the front end of the surrounding image 5 where the guide line 71B intersects with the peripheral edge of the surrounding image 5. A position of a starting point 72c of the guide line 72B on the left side displayed on the trailer 60 is a position indicating the wheel 62 of the left side. An end point 72d of the guide line 72B is located at a right end of the surrounding image 5 where the guide line 72 intersects with the peripheral edge of the surrounding image 5. Positions of starting and ending points of the guide line 71A and the guide line 72A are the same as those of the guide line 71 and the guide line 72 described in FIG. 4.

As described above, according to the control ECU 20 of the present invention, the display mode of the guide lines representing the first predictive guide for the vehicle 10 and the second predictive guide for the trailer 60 can be changed based on the turning direction of the vehicle 10 and the relative direction of the trailer 60 with respect to the vehicle 10, the trailer 60 being towed by the vehicle 10. Therefore, when the vehicle 10 towing the trailer 60 is traveling, only the most necessary and important guide lines can be displayed on the surrounding image 5. Thereby, the visibility of the guide lines of the vehicle 10 and the trailer 60 can be improved.

A control method described in the embodiments described above can be implemented by executing a control program prepared in advance on a computer. The control program is recorded on a computer-readable storage medium, and is executed by being read from the storage medium. The control program may be provided in a form stored in a non-transitory storage medium such as a flash memory, or may be provided via a network such as the Internet. The computer that executes the control program may be in the control device, may be in an electronic device such as a smartphone, a tablet terminal, or a personal computer that can communicate with the control device, or may be in a server device that can communicate with the control devices and electronic devices.

Although the embodiments of the present invention are described above, the present invention is not limited to the above-described embodiments, and can be modified, improved, or the like as appropriate.

The specification describes at least the following matters. Although components corresponding to those in the above-described embodiments are shown in parentheses, the present invention is not limited thereto.

(1) A control device (control ECU 20) that includes
a movement state acquisition unit (movement state acquisition unit 55) that acquires a movement state of a moving object (vehicle 10) towing a trailer (trailer 60),
a relative position acquisition unit (relative position acquisition unit 56) that acquires a relative position between the moving object and the trailer, and
a display control unit (display control unit 57) that displays a first predictive guide indicating a predicted passing area of the moving object and a second predictive guide indicating a predicted passing area of the trailer, where
the display control unit changes display of at least one of the first predictive guide and the second predictive guide based on the movement state and the relative position.

According to (1), since it is possible to change the display mode of the first predictive guide for the moving object and the second predictive guide for the trailer based on the movement state of the moving object towing the trailer and the relative position between the moving object and the trailer, the visibility of the guide lines for the moving object and the trailer can be improved.

(2) The control device according to (1), where
   the movement state acquisition unit acquires a turning direction of the moving object as the movement state, and
   the relative position acquisition unit acquires a relative direction of the trailer with respect to the moving object as the relative position.

As in (2), to change the display of the predictive guide, it is preferable to acquire the turning direction of the moving object as the movement state of the moving object, and to acquire the relative direction of the moving object with respect to the trailer as the relative position between the moving object and the trailer.

(3) The control device according to (2), where
   when the turning direction and the relative direction match,
   the display control unit
   sets a display mode of a guide line on a side of the turning direction in the first predictive guide to a display mode with lower visibility than a display mode of a guide line on a side opposite to the turning direction in the first predictive guide, and
   sets a display mode of a guide line on a side opposite to the turning direction in the second predictive guide to a display mode with lower visibility than a display mode of a guide line on a side of the turning direction in the second predictive guide.

As in (3), when the turning direction and the relative direction match, by displaying the guide line on the side of the turning direction of the moving object in a display mode with low visibility in the first predictive guide, and displaying the guide line on the side opposite to the turning direction of the moving object in a display mode with low visibility in the second predictive guide, the visibility of the guide lines for the moving object and the trailer can be improved.

(4) The control device according to (3), where
   when the turning direction and the relative direction match,
   the display control unit
   displays the guide line on the side opposite to the turning direction in the first predictive guide, and hides the guide line on the side of the turning direction in the first predictive guide, and
   displays the guide line on the side of the turning direction in the second predictive guide, and hides the guide line on the side opposite to the turning direction in the second predictive guide.

As in (4), when the turning direction and the relative direction match, by hiding the guide line on the side of the turning direction of the moving object in the first predictive guide and hiding the guide line on the side opposite to the turning direction of the moving object in the second predictive guide, the visibility of the guide lines for the moving object and trailer can be improved.

(5) The control device according to (3) or (4), wherein
   when the turning direction and the relative direction do not match,
   the display control unit
   displays the guide line on the side opposite to the turning direction in the first predictive guide, and hides the guide line on the side of the turning direction in the first predictive guide, and
   displays the guide line on the side of the turning direction in the second predictive guide and the guide line on the side opposite to the turning direction in the second predictive guide.

As in (5), when the turning direction and the relative direction do not match, by displaying the guide line on the side opposite to the moving object, hiding the guide line on the side of the turning direction in the first predictive guide, and displaying the guide line on the side of the turning direction of the moving object and the guide line on the side opposite in the second predictive guide, the visibility of the guide lines for the moving object and the trailer can be improved.

(6) The control device according to any one of (2) to (5), where
   the display control unit changes display of the second predictive guide based on a map (map 80) that associates the turning direction and the relative direction with a display mode of the second predictive guide.

According to (6), the second predictive guide can be appropriately changed based on the map associated therewith in advance.

(7) The control device according to any one of (2) to (6), where
   when the turning direction and the relative direction match while the moving object moves forward,
   the display control unit
   sets a display mode of a guide line on a side of the turning direction in the first predictive guide to a display mode with lower visibility than a display mode of a guide line on a side opposite to the turning direction in the first predictive guide, and
   sets a display mode of a guide line on a side opposite to the turning direction in the second predictive guide to a display mode with lower visibility than a display mode of a guide line on a side of the turning direction in the second predictive guide.

As in (7), when the turning direction and the relative direction match while the moving object moves forward, by displaying the guide line on the side of the turning direction of the moving object in a display mode with low visibility in the first predictive guide, and displaying the guide line on the side opposite to the turning direction of the moving object in a display mode with low visibility in the second predictive guide, the visibility of the guide lines for the moving object and the trailer can be improved.

(8) The control device according to any one of (2) to (7), where
   the display control unit
   acquires a surrounding image (surrounding image 5) around the moving object, and
   displays at least one of the first predictive guide and the second predictive guide superimposed on the surrounding image.

As in (8), it is preferable that the first predictive guide for the moving object and the second predictive guide for the trailer be displayed superimposed on the surrounding image.

(9) The control device according to any one of (2) to (8), where
   the display control unit
   sets an end point position of a guide line on a side of the turning direction in the second predictive guide on an edge of a displaying image of the first predictive guide and the second predictive guide.

As in (9), the visibility of the guide lines can be improved by setting the end point position of the guide line in the second predictive guide on an edge of a display screen.

(10) The control device according to any one of (2) to (9), where
the display control unit
displays the first predictive guide and the second predictive guide together with a moving object image indicating a position of the moving object, and
when a line indicating an edge opposite to the turning direction in the predicted passing area of the trailer overlaps the moving object image, sets an end point position of a guide line on a side opposite to the turning direction in the second predictive guide such that the guide line on the side opposite to the turning direction in the second predictive guide does not overlap with the moving object image.

As in (10), when the predicted passing area of the trailer overlaps with the moving object image, by setting the end point position of the guide line such that the guide line does not overlap with the moving object image, the visibility of the guide lines can be improved.

(11) The control device according to (10), where
when the line indicating the edge does not overlap with the moving object image, the display control unit sets the end point position of the guide line on the side opposite to the turning direction in the second predictive guide to a same position as a front end of the moving object image in a traveling direction of the moving object.

As in (11), when the predicted passing area of the trailer does not overlap with the moving object image, by setting the end point position of the guide line to the same position as the front end of the moving object image, the visibility of the guide lines can be improved.

(12) The control device according to any one of (2) to (11), where
when the moving object moves rearward,
the display control unit
hides the first predictive guide, and
displays a guide line on a side of the relative direction in the second predictive guide and a guide line on a side opposite to the relative direction in the second predictive guide.

As in (12), when the moving object moves rearward, the first predictive guide is hidden, and the guide lines on the side of the relative direction of the moving object with respect to the trailer and the side opposite to the relative direction in the second predictive guide are displayed, such that the visibility of the guide lines can be improved.

(13) The control device according to any one of (1) to (12), where
on a prediction of switching of a traveling direction of the trailer during a backward movement of the moving object, the display control unit sets an end point position of the second predictive guide to a point where the traveling direction of the trailer is switched.

According to (13), when it is predicted that the traveling direction of the trailer towed by the moving object will be switched when the moving object moves rearward, by setting the point at which the traveling direction is switched as the end point position of the second predictive guide, the guide lines can be appropriately displayed and visibility thereof can be improved.

(14) The control device according to any one of (1) to (13), where
on a prediction of non-switching of a traveling direction of the trailer during a backward movement of the moving object, the display control unit sets an end point position of the second predictive guide to an edge of a displaying image of the first predictive guide and the second predictive guide.

According to (14), when it is predicted that the traveling direction of the trailer towed by the moving object will not be switched when the moving object moves rearward, by setting the end point position of the guide line in the second predictive guide at the edge of the display screen, the visibility of the guide lines can be improved.

(15) The control device according to any one of (1) to (14), where
the display control unit causes a display device in the moving object to display the first predictive guide and the second predictive guide.

As in (15), it is preferable that the first predictive guide for the moving object and the second predictive guide for the trailer be displayed on the display device in the moving object.

(16) The control device according to any one of (1) to (14), where
the display control unit causes a display device in an information terminal capable of communicating with the moving object to display the first predictive guide and the second predictive guide.

According to (16), displaying the first predictive guide for the moving object and the second predictive guide for the trailer on the display device of the information terminal capable of communicating with the moving object is effective, for example, during remote parking.

(17) A control method using a control device includes steps executed by a processor of the control device of:
acquiring a movement state of a moving object towing a trailer,
acquiring a relative position between the moving object and the trailer,
displaying a first predictive guide indicating a predicted passing area of the moving object and a second predictive guide indicating a predicted passing area of the trailer, and
changing display of at least one of the first predictive guide and the second predictive guide based on the movement state and the relative position.

According to (17), since it is possible to change a display mode of the first predictive guide for the moving object and the second predictive guide for the trailer based on the movement state of the moving object towing the trailer and the relative position between the moving object and the trailer, the visibility of the guide lines for the moving object and trailer can be improved.

(18) A storage medium storing a control program for a control device that causes a processor of the control device to execute processes of:
acquiring a movement state of a moving object towing a trailer,
acquiring a relative position between the moving object and the trailer,
displaying a first predictive guide indicating a predicted passing area of the moving object and a second predictive guide indicating a predicted passing area of the trailer, and
changing display of at least one of the first predictive guide and the second predictive guide based on the movement state and the relative position.

According to (18), since it is possible to change a display mode of the first predictive guide for the moving object and the second predictive guide for the trailer based on the movement state of the moving object towing the trailer and the relative position between the moving object and the trailer, the visibility of the guide lines for the moving object and trailer can be improved.

What is claimed is:

1. A control device comprising:
a movement state acquisition unit configured to acquire a movement state of a moving object towing a trailer;
a relative position acquisition unit configured to acquire a relative position between the moving object and the trailer; and
a display control unit configured to display a first predictive guide indicating a predicted passing area of the moving object and a second predictive guide indicating a predicted passing area of the trailer, wherein
the display control unit is configured to change display of at least one of the first predictive guide and the second predictive guide based on the movement state and the relative position,
the movement state acquisition unit acquires a turning direction of the moving object as the movement state,
the relative position acquisition unit acquires a relative direction of the trailer with respect to the moving object as the relative position,
the display control unit is configured to, when the moving object turns,
set a display mode of a guide line on a side of the turning direction in the first predictive guide to a display mode with lower visibility than a display mode of a guide line on a side opposite to the turning direction in the first predictive guide, or
display the guide line on the side opposite to the turning direction in the first predictive guide, and hide the guide line on the side of the turning direction in the first predictive guide, and
the display control unit is configured to change a display mode of a guide line on the side of the turning direction and a guide line on the side opposite to the turning direction in the second predictive guide based on whether the turning direction and the relative direction match.

2. The control device according to claim 1, wherein
when the turning direction and the relative direction match, the display control unit
sets the display mode of a guide line on a side opposite to the turning direction in the second predictive guide to a display mode with lower visibility than a display mode of a guide line on a side of the turning direction in the second predictive guide.

3. The control device according to claim 1, wherein
when the turning direction and the relative direction match, the display control unit
displays the guide line on the side of the turning direction in the second predictive guide, and hides the guide line on the side opposite to the turning direction in the second predictive guide.

4. The control device according to claim 1, wherein
when the turning direction and the relative direction do not match, the display control unit
displays the guide line on the side of the turning direction in the second predictive guide and the guide line on the side opposite to the turning direction in the second predictive guide.

5. The control device according to claim 1, wherein
the display control unit is configured to change display of the second predictive guide based on a map that associates the turning direction and the relative direction with a display mode of the second predictive guide.

6. The control device according to claim 1, wherein
when the turning direction and the relative direction match while the moving object moves forward, the display control unit
sets a display mode of a guide line on a side of the turning direction in the first predictive guide to a display mode with lower visibility than a display mode of a guide line on a side opposite to the turning direction in the first predictive guide, and
sets a display mode of a guide line on a side opposite to the turning direction in the second predictive guide to a display mode with lower visibility than a display mode of a guide line on a side of the turning direction in the second predictive guide.

7. The control device according to claim 1, wherein the display control unit configured to
acquire a surrounding image around the moving object, and
display at least one of the first predictive guide and the second predictive guide superimposed on the surrounding image.

8. The control device according to claim 1, wherein
the display control unit sets an end point position of a guide line on a side of the turning direction in the second predictive guide on an edge of a displaying image of the first predictive guide and the second predictive guide.

9. A control device comprising:
a movement state acquisition unit configured to acquire a movement state of a moving object towing a trailer;
a relative position acquisition unit configured to acquire a relative position between the moving object and the trailer; and
a display control unit configured to display a first predictive guide indicating a predicted passing area of the moving object and a second predictive guide indicating a predicted passing area of the trailer, wherein
the display control unit is configured to change display of at least one of the first predictive guide and the second predictive guide based on the movement state and the relative position,
the movement state acquisition unit acquires a turning direction of the moving object as the movement state,
the relative position acquisition unit acquires a relative direction of the trailer with respect to the moving object as the relative position, and
the display control unit is configured to
displays the first predictive guide and the second predictive guide together with a moving object image indicating a position of the moving object, and
when a line indicating an edge opposite to the turning direction in the predicted passing area of the trailer overlaps the moving object image, display a guide line on a side opposite to the turning direction in the second predictive guide such that the guide line on the side opposite to the turning direction in the second predictive guide does not overlap with the moving object image.

10. The control device according to claim 9, wherein
when the line indicating the edge does not overlap with the moving object image, the display control unit sets the end point position of the guide line on the side opposite to the turning direction in the second predictive guide to a same position as a front end of the moving object image in a traveling direction of the moving object.

11. The control device according to claim 1, wherein
when the moving object moves rearward, the display control unit
hides the first predictive guide, and
displays a guide line on a side of the relative direction in the second predictive guide and a guide line on a side opposite to the relative direction in the second predictive guide.

12. The control device according to claim 1, wherein
on a prediction of switching of a traveling direction of the trailer during a rearward movement of the moving object, the display control unit sets an end point position of the second predictive guide to a point where the traveling direction of the trailer is switched.

13. The control device according to claim 1, wherein
on a prediction of non-switching of a traveling direction of the trailer during a rearward movement of the moving object, the display control unit sets an end point position of the second predictive guide to an edge of a displaying image of the first predictive guide and the second predictive guide.

14. The control device according to claim 1, wherein
the display control unit is configured to cause a display device in the moving object to display the first predictive guide and the second predictive guide.

15. The control device according to claim 1, wherein
the display control unit is configured to cause a display device in an information terminal capable of communicating with the moving object to display the first predictive guide and the second predictive guide.

16. A control method using a control device, the method comprising steps executed by a processor of the control device of:
acquiring a movement state of a moving object towing a trailer,
acquiring a relative position between the moving object and the trailer,
displaying a first predictive guide indicating a predicted passing area of the moving object and a second predictive guide indicating a predicted passing area of the trailer, and
changing display of at least one of the first predictive guide and the second predictive guide based on the movement state and the relative position, wherein
the acquiring the movement state acquires a turning direction of the moving object as the movement state,
the acquiring the relative position acquires a relative direction of the trailer with respect to the moving object as the relative position,
the displaying the first predictive guide and the second predictive guide includes, when the moving object turns,
setting a display mode of a guide line on a side of the turning direction in the first predictive guide to a display mode with lower visibility than a display mode of a guide line on a side opposite to the turning direction in the first predictive guide, or
displaying the guide line on the side opposite to the turning direction in the first predictive guide, and hide the guide line on the side of the turning direction in the first predictive guide, and
the displaying the first predictive guide and the second predictive guide further includes changing a display mode of a guide line on the side of the turning direction and a guide line on the side opposite to the turning direction in the second predictive guide based on whether the turning direction and the relative direction match.

17. A non-transitory computer-readable storage medium storing a control program for a control device that causes a processor of the control device to execute processes of,
acquiring a movement state of a moving object towing a trailer,
acquiring a relative position between the moving object and the trailer,
displaying a first predictive guide indicating a predicted passing area of the moving object and a second predictive guide indicating a predicted passing area of the trailer, and
changing display of at least one of the first predictive guide and the second predictive guide based on the movement state and the relative position, wherein
the acquiring the movement state acquires a turning direction of the moving object as the movement state,
the acquiring the relative position acquires a relative direction of the trailer with respect to the moving object as the relative position,
the displaying the first predictive guide and the second predictive guide includes, when the moving object turns,
setting a display mode of a guide line on a side of the turning direction in the first predictive guide to a display mode with lower visibility than a display mode of a guide line on a side opposite to the turning direction in the first predictive guide, or
displaying the guide line on the side opposite to the turning direction in the first predictive guide, and hide the guide line on the side of the turning direction in the first predictive guide, and
the displaying the first predictive guide and the second predictive guide further includes changing a display mode of a guide line on the side of the turning direction and a guide line on the side opposite to the turning direction in the second predictive guide based on whether the turning direction and the relative direction match.

18. The control device according to claim 9, wherein
the display control unit is configured to, when the line indicating the edge opposite to the turning direction in the predicted passing area of the trailer overlaps the moving object image, set an end point position of the guide line on the side opposite to the turning direction in the second predictive guide such that the guide line on the side opposite to the turning direction in the second predictive guide does not overlap with the moving object image.

* * * * *